US010371866B2

(12) United States Patent
Frease et al.

(10) Patent No.: US 10,371,866 B2
(45) Date of Patent: Aug. 6, 2019

(54) OPTICAL ELEMENT HAVING A COATING FOR ENHANCED VISIBILITY OF A MARK AND METHOD FOR MAKING THE OPTICAL ELEMENT

(71) Applicant: Transitions Optical, Ltd., Galway (IE)

(72) Inventors: Jennine M. Frease, St. Petersburg, FL (US); Joseph D. Turpen, Safety Harbor, FL (US); William D. Carpenter, Pinellas Park, FL (US); Kevin J. Stewart, Palm Harbor, FL (US)

(73) Assignee: Transitions Optical, Ltd., Tuam, County Galway (IE)

( * ) Notice: Subject to any disclaimer, the term of this patent is extended or adjusted under 35 U.S.C. 154(b) by 0 days.

(21) Appl. No.: 15/556,326

(22) PCT Filed: Mar. 10, 2016

(86) PCT No.: PCT/EP2016/055201
§ 371 (c)(1),
(2) Date: Sep. 7, 2017

(87) PCT Pub. No.: WO2016/142496
PCT Pub. Date: Sep. 15, 2016

(65) Prior Publication Data
US 2018/0095190 A1 Apr. 5, 2018

Related U.S. Application Data

(60) Provisional application No. 62/130,777, filed on Mar. 10, 2015.

(51) Int. Cl.
G02B 1/10 (2015.01)
G02C 7/02 (2006.01)
B24B 13/005 (2006.01)

(52) U.S. Cl.
CPC ............ *G02B 1/10* (2013.01); *B24B 13/0055* (2013.01); *G02C 7/022* (2013.01); *G02C 7/024* (2013.01)

(58) Field of Classification Search
CPC ....... G02C 7/021; G02C 2202/16; G02B 1/10
(Continued)

(56) References Cited

U.S. PATENT DOCUMENTS 4,731,264 A 3/1988 Lin et al.
4,756,973 A 7/1988 Sakagami et al.
(Continued)

FOREIGN PATENT DOCUMENTS

CN 102639315 A 8/2012
CN 102686682 A 9/2012
(Continued)

Primary Examiner — Darryl J Collins
(74) Attorney, Agent, or Firm — The Web Law Firm

(57) ABSTRACT

The present invention relates to an optical element that includes a mark (18). The optical element has a first coating layer (22) over at least a portion of a surface of an optical substrate (20) having the mark (18) on the surface of the optical substrate, and one or more additional coating layers (24) over at least a portion of the first coating layer (22). The first coating layer has a first refractive index, and the optical substrate and the mark may have a second refractive index. A difference between the first refractive index and the second refractive index has an absolute value of 0.02 to 0.24. At least one of the first coating layer (22) and the one or more additional coating layers (24) may be applied by a controlled deposition of a coating material in droplet form.

19 Claims, 8 Drawing Sheets

(58) Field of Classification Search
USPC .................................. 351/159.28, 159.69
See application file for complete search history.

(56) References Cited

U.S. PATENT DOCUMENTS

| | | | |
|---|---|---|---|
| 5,100,232 A | 3/1992 | Smith et al. | |
| 5,134,191 A | 7/1992 | Takarada et al. | |
| 5,231,156 A | 7/1993 | Lin | |
| 5,462,806 A | 10/1995 | Konishi et al. | |
| 5,645,767 A | 7/1997 | Van Gemert | |
| 5,658,501 A | 8/1997 | Kumar et al. | |
| 5,960,550 A | 10/1999 | Weir et al. | |
| 5,962,617 A | 10/1999 | Slagel | |
| 6,034,826 A | 3/2000 | Helmecke | |
| 6,113,814 A | 9/2000 | Gemert et al. | |
| 6,296,785 B1 | 10/2001 | Nelson et al. | |
| 6,352,747 B1 | 3/2002 | Blackburn et al. | |
| 6,818,276 B2 * | 11/2004 | Bourdelais | B32B 7/02 428/141 |
| 7,452,611 B2 | 11/2008 | Blackburn et al. | |
| 7,757,629 B2 | 7/2010 | Lydon et al. | |
| 7,931,832 B2 | 4/2011 | Pugh et al. | |
| 8,746,879 B2 | 6/2014 | Jiang et al. | |
| 8,828,284 B2 | 9/2014 | Carpenter | |
| 8,834,004 B2 | 9/2014 | Thompson et al. | |
| 2002/0196409 A1 | 12/2002 | Jani | |
| 2004/0142105 A1 | 7/2004 | Sakurada et al. | |
| 2006/0210213 A1 | 9/2006 | Huang et al. | |
| 2011/0039077 A1 | 2/2011 | Klemann | |
| 2012/0236255 A1 * | 9/2012 | Jiang | B29D 11/0073 351/159.42 |
| 2013/0000499 A1 | 1/2013 | Ookubo et al. | |
| 2014/0055743 A1 * | 2/2014 | Okubo | G02C 7/021 351/159.69 |

FOREIGN PATENT DOCUMENTS

| | | |
|---|---|---|
| EP | 2192431 A2 | 2/2010 |
| JP | 200298802 A | 4/2002 |
| JP | 2003145747 A | 5/2003 |
| JP | 2004347947 A | 12/2004 |
| JP | 200517761 A | 1/2005 |
| JP | 201373108 A | 4/2013 |
| KR | 1019990050059 A | 7/1999 |
| WO | 9420581 A1 | 9/1994 |
| WO | 2015054036 A1 | 4/2015 |

* cited by examiner

OPTICAL ELEMENT HAVING A COATING FOR ENHANCED VISIBILITY OF A MARK AND METHOD FOR MAKING THE OPTICAL ELEMENT

CROSS REFERENCE TO RELATED APPLICATIONS

The present application is a national stage of International Patent Application No. PCT/EP2016/055201, filed Mar. 10, 2016, which claims priority to Provisional U.S. Application No. 62/130,777 filed on Mar. 10, 2015, and titled "Optical Element Having a Coating for Enhanced Visibility of a Mark and Method for Making the Optical Element", the disclosures of which are incorporated by reference in their entirety.

BACKGROUND OF THE INVENTION

Field of the Invention

The present invention relates to a method of producing an optical element, such as an ophthalmic lens having a mark on a surface thereof, that involves coating the optical element with a coating having an index of refraction different from that of a base substrate. The present invention also relates to an optical element having such a coating.

Description of the Related Art

With optical elements, such as ophthalmic lenses, one or more marks are often applied to or introduced into a surface of the optical element. Such marks can be used for purposes of, for example, identifying the manufacturer of the optical element, identifying a particular production run that resulted in formation of the optical element, and/or providing information about the optical element, such as optical characteristics (e.g., optical axes, centering points, etc.), the refractive index of the material from which the optical element was fabricated, and/or coatings residing on the optical element, such as antireflective and/or scratch-resistant coatings. Such marks are typically unobservable when the optical element is in normal use, such as being unobservable by a person wearing a pair of ophthalmic lenses having such a mark. The marks can be rendered observable under certain limited circumstances, such as exposure to a particular wavelength of light or applied vapor, so as to determine the information contained in the mark. Typically, the marks are of relatively small dimensions. U.S. Pat. No. 6,034,826 describes an optical instrument designed for observing surface engravings on optical lenses. It is often desirable that the mark be a permanent mark, so the information provided thereby can be accessed more than once and/or at a time that is remote from formation of the mark.

A method of introducing a mark into an optical element includes, for example, physically engraving a surface of the optical element, such as with a stylus. Chemical leeching can be used to introduce a mark, such as with optical elements fabricated from silica based glass. Lasers can also be used to introduce a mark into the surface of or within the body of an optical element. A mark may be introduced during the molding process. Present methods of introducing a mark into an optical element can result in the formation of marks that are undesirably observable, under some conditions, when the optical element is in normal use. For example, progressive ophthalmic lenses typically include one or more marks that can be used by an optician to properly and accurately fit the lenses on a person for whom the lenses have been prepared. Such marks can, in some instances, be visually observable to a wearer of the lenses, appearing, for example, as a small area of optical distortion in one or both of the lenses.

It would be desirable to develop new methods of producing optical elements having one or more marks. It would be further desirable that such newly developed methods result in the formation of marks that are substantially unobservable during normal use, and which can be rendered observable under reasonably controllable conditions.

SUMMARY OF THE INVENTION

In accordance with one aspect, an optical element may include (a) a first coating layer over at least a portion of a surface of an optical substrate having a mark on the surface of the optical substrate, and (b) one or more additional coating layers over at least a portion of the first coating layer. The first coating layer may have a first refractive index, and the optical substrate may have a second refractive index. A difference between the first refractive index and the second refractive index may have an absolute value of 0.02 to 0.24, preferably 0.05 to 0.24, or more preferably 0.07 to 0.24. One or more additional coating layers may have a third refractive index. A difference between the second refractive index of the optical substrate and the mark and the third refractive index may have an absolute value of less than 0.02. At least one of the first coating layer and the one or more additional coating layers may be applied by a controlled deposition of a coating material in droplet form. A thin film coating may be interposed between the first coating layer and the optical substrate. An absolute value of a difference between a refractive index of the thin film coating and the second refractive index of the optical substrate may be less than 0.02.

In accordance with another aspect, the first coating layer may completely cover the mark on the surface of the optical substrate. The first coating layer may cover at least a portion of the mark on the surface of the optical substrate. The mark may be an optical reference mark, an indicia, or a topographical mark. The mark may be observable when a source of electromagnetic energy is viewed through the optical element or when the electromagnetic energy is reflected from the optical element. The first coating layer may enhance a visibility of the mark when a source of electromagnetic energy is viewed through the optical element or when the electromagnetic energy is reflected from the optical element. An absence of the first coating layer may reduce or eliminate a visibility of the mark when a source of electromagnetic energy is viewed through the optical element or when the electromagnetic energy is reflected from the optical element. The first refractive index may have a range of 1.37-2.14. The second refractive index may have a range of 1.45 to 1.90. At least a portion of the mark may protrude from the surface of the optical substrate. At least a portion of the mark may be depressed into the surface of the optical substrate.

In accordance with another aspect, a method of producing an optical element may include (a) applying a first coating layer over at least a portion of a surface of an optical substrate having a mark on the surface of the optical substrate, and (b) applying one or more additional coating layers over at least a portion of the first coating layer. The first coating layer may have a first refractive index, and the optical substrate may have a second refractive index. A difference between the first refractive index and the second refractive index, in a cured state of the first coating layer, may have an absolute value of 0.02 to 0.24, preferably 0.05 to 0.24, or more preferably 0.07 to 0.24.

In accordance with another aspect, the method may include pre-treating at least a portion of the surface of the optical substrate prior to applying the first coating layer. The pre-treating may include a corona treatment. The method may further include curing the first coating layer prior to applying the one or more additional coating layers. The curing may include heat treatment. The method may further include curing the optical element after applying one or more additional coating layers over at least a portion of the first coating layer. The curing may include heat treatment. The method may further include leveling at least one of the first coating layer and the one or more additional coating layers. The leveling may include vibrating the optical element, such as vibrating the optical element linearly, vibrating the optical element linearly along one axis, vibrating the optical element linearly along two axes, and vibrating the optical element linearly in one plane. The method may further include leveling during applying at least one of the first coating layer and the one or more additional coating layers. The leveling may include vibrating the optical element, such as vibrating the optical element linearly, vibrating the optical element linearly along one axis, vibrating the optical element linearly along two axes, and vibrating the optical element linearly in one plane. The leveling may include vibrating the optical element at a frequency of 10 Hz to 110 Hz. The leveling may include vibrating the optical element for 3 seconds to 30 seconds.

In accordance with another aspect, the controlled deposition of the coating material may be performed using an inkjet printing apparatus. The inkjet printing apparatus may be a piezo-electric inkjet printing apparatus or a thermal inkjet printing apparatus. A density of droplets of the coating material may be between 100 droplets-per-inch to 1200 droplets-per-inch. At least one of the first coating layer and the one or more additional coating layers may be applied as a mixture of two or more coating compositions. At least one of the first coating layer and the one or more additional coating layers may be applied in a single pass, or in two or more passes. At least one of the first coating layer and the one or more additional coating layers may be applied linearly. At least one of the first coating layer and the one or more additional coating layers may be applied uniformly.

In accordance with another aspect, the portion of the surface of the optical element may be selected from at least one of: a forward surface of the optical element, and a rear surface of the optical element. The first coating layer may be selected from thermoplastic clear films, crosslinked clear films, and combinations thereof. The first coating layer may be formed from a clear coating composition. The first coating layer may be selected from a single layer clear film and multi-layered clear film. The first coating layer may include at least one of a static dye and a photochromic compound. The optical element may be selected from ophthalmic elements, display elements, windows, and mirrors. The ophthalmic element may be selected from a corrective lens, non-corrective lens, contact lens, intra-ocular lens, magnifying lens, protective lens, and visor. At least one of the first coating layer and the one or more additional coating layers may be applied on a concave surface of the optical element, a convex surface of the optical element, and/or a planar surface of the optical element. The method may further include moving the optical element during applying at least one of the first coating layer and the one or more additional coating layers. The method may further include holding stationary the optical element during applying at least one of the first coating layer and the one or more additional coating layers.

In accordance with other aspects, a method of making an optical article may be characterized by one or more of the following clauses:

Clause 1. A method of producing an optical element, the method comprising:

(a) applying a first coating layer over at least a portion of a surface of an optical substrate having a mark on the surface of the optical substrate; and (b) applying one or more additional coating layers over at least a portion of the first coating layer, wherein, the first coating layer has a first refractive index and the optical substrate and the mark have a second refractive index, and a difference between the first refractive index and the second refractive index has an absolute value of 0.02 to 0.24, preferably 0.05 to 0.24, or more preferably 0.07 to 0.24.

Clause 2. The method of clause 1, wherein one or more additional coating layers have a third refractive index, and wherein a difference between the second refractive index of the optical substrate and the mark and the third refractive index has an absolute value of less than 0.02.

Clause 3. The method of clause 1 or clause 2, wherein the first coating layer completely covers the mark on the surface of the optical substrate which contains the mark.

Clause 4. The method of any of clauses 1-3, wherein the first coating layer covers at least a portion of the mark on the surface of the optical substrate.

Clause 5. The method of any of clauses 1-4, wherein the mark is an optical reference mark.

Clause 6. The method of any of clauses 1-5, wherein the mark is an indicia.

Clause 7. The method of any of clauses 1-6, wherein the mark is observable when a source of electromagnetic energy is viewed through the optical substrate or when the electromagnetic energy is reflected from the optical element.

Clause 8. The method of any of clauses 1-7, wherein the first coating layer enhances a visibility of the mark when a source of electromagnetic energy is viewed through the optical element or when the electromagnetic energy is reflected from the optical element.

Clause 9. The method of any of clauses 1-8, wherein an absence of the first coating layer reduces or eliminates a visibility of the mark when a source of electromagnetic energy is viewed through the optical element or when the electromagnetic energy is reflected from the optical element.

Clause 10. The method of any of clauses 1-9, wherein the first refractive index has a range of 1.37 to 2.14.

Clause 11. The method of any of clauses 1-10, wherein the second refractive index has a range of 1.45 to 1.90.

Clause 12. The method of any of clauses 1-11, wherein the mark is a topographical mark.

Clause 13. The method of clause 12, wherein at least a portion of the mark protrudes from the surface of the optical substrate.

Clause 14. The method of clause 12 or clause 13, wherein at least a portion of the mark is depressed into the surface of the optical substrate.

Clause 15. The method of any of clauses 1-14, further comprising pre-treating at least a portion of the surface of the optical substrate prior to applying the first coating layer.

Clause 16. The method of clause 15, wherein the pre-treating comprises a corona treatment, plasma treatment, ultraviolet radiation treatment or combination of treatments.

Clause 17. The method of any of clauses 1-16, further comprising curing the first coating layer prior to applying the one or more additional coating layers.

Clause 18. The method of clause 17, wherein the curing comprises heat treatment, radiation treatment, or combination of both.

Clause 19. The method of any of clauses 1-18, further comprising curing the optical element after applying one or more additional coating layers over at least a portion of the first coating layer.

Clause 20. The method of clause 19, wherein the curing comprises heat treatment, radiation treatment, or combination of both.

Clause 21. The method of any of clauses 1-20, further comprising leveling at least one of the first coating layer and the one or more additional coating layers.

Clause 22. The method of clause 21, wherein the leveling comprises vibrating the optical element.

Clause 23. The method of clause 21 or clause 22, wherein the leveling comprises vibrating the optical element linearly.

Clause 24. The method of any of clauses 21-23, wherein the leveling comprises vibrating the optical element linearly along one axis.

Clause 25. The method of any of clauses 21-24, wherein the leveling comprises vibrating the optical element linearly along two axes.

Clause 26. The method of any of clauses 21-25, wherein the leveling comprises vibrating the optical element linearly in one plane.

Clause 27. The method of any of clauses 21-26, wherein the leveling comprises vibrating the optical element at a frequency of 10 Hz to 110 Hz.

Clause 28. The method of any of clauses 21-27, wherein the leveling comprises vibrating the optical element for 3 seconds to 30 seconds.

Clause 29. The method of any of clauses 1-28, further comprising leveling during applying at least one of the first coating layer and the one or more additional coating layers.

Clause 30. The method of clause 29, wherein the leveling comprises vibrating the optical element.

Clause 31. The method of clause 29 or clause 30, wherein the leveling comprises vibrating the optical element linearly.

Clause 32. The method of any of clauses 29-31, wherein the leveling comprises vibrating the optical element linearly along one axis.

Clause 33. The method of any of clauses 29-32 wherein the leveling comprises vibrating the optical element linearly along two axes.

Clause 34. The method of any of clauses 29-33, wherein the leveling comprises vibrating the optical element linearly in one plane.

Clause 35. The method of any of clauses 29-34, wherein the leveling comprises vibrating the optical element at a frequency of 10 Hz to 110 Hz.

Clause 36. The method of any of clauses 29-35, wherein the leveling comprises vibrating the optical element for 3 seconds to 30 seconds.

Clause 37. The method of any of clauses 1-36, wherein at least one of the first coating layer and the one or more additional coating layers is applied by a controlled deposition of a coating material in droplet form.

Clause 38. The method of clause 37, wherein the controlled deposition of the coating material is performed using an inkjet printing apparatus.

Clause 39. The method of clause 38, wherein the inkjet printing apparatus is a piezo-electric inkjet printing apparatus.

Clause 40. The method of clause 38 or clause 39, wherein the inkjet printing apparatus is a thermal inkjet printing apparatus.

Clause 41. The method of any of clauses 37-40, wherein a density of droplets of the coating material is between 100 droplets-per-inch to 1200 droplets-per-inch.

Clause 42. The method of any of clauses 37-41, wherein at least one of the first coating layer and the one or more additional coating layers is applied as a mixture of two or more coating compositions.

Clause 43. The method of any of clauses 37-42, wherein at least one of the first coating layer and the one or more additional coating layers is applied in a single pass.

Clause 44. The method of any of clauses 37-43, wherein at least one of the first coating layer and the one or more additional coating layers is applied in two or more passes.

Clause 45. The method of any of clauses 37-44, wherein at least one of the first coating layer and the one or more additional coating layers is applied linearly.

Clause 46. The method of any of clauses 37-45, wherein at least one of the first coating layer and the one or more additional coating layers is applied uniformly.

Clause 47. The method of any of clauses 1-46, wherein the portion of the surface of the optical element is selected from at least one of: a forward surface of the optical element and a rear surface of the optical element.

Clause 48. The method of any of clauses 1-47, wherein the first coating layer is selected from thermoplastic clear films, crosslinked clear films, and combinations thereof.

Clause 49. The method of any of clauses 1-48, wherein the first coating layer is formed from a clear coating composition.

Clause 50. The method of any of clauses 1-49, wherein the first coating layer is selected from a single layer clear film and multi-layered clear film.

Clause 51. The method of any of clauses 1-50, wherein the first coating layer includes at least one of a static dye and a photochromic compound.

Clause 52. The method of any of clauses 1-51, wherein at least one of the first coating layer and the one or more additional coating layers is applied on a concave surface of the optical element.

Clause 53. The method of any of clauses 1-52, wherein at least one of the first coating layer and the one or more additional coating layers is applied on a convex surface of the optical element.

Clause 54. The method of any of clauses 1-53, wherein at least one of the first coating layer and the one or more additional coating layers is applied on a planar surface of the optical element.

Clause 55. The method of any of clauses 1-54, further comprising moving the optical element during applying at least one of the first coating layer and the one or more additional coating layers.

Clause 56. The method of any of clauses 1-55, further comprising holding stationary the optical element during applying at least one of the first coating layer and the one or more additional coating layers.

Clause 57. The method of any of clauses 1-56 further comprising a thin film coating interposed between the first coating layer and the optical substrate.

Clause 58. The method of clause 57, wherein an absolute value of a difference between a refractive index of the thin film coating and the second refractive index of the optical substrate is less than 0.02.

Clause 59. The method of any of clauses 1-58, wherein a thickness of the at least one first coating layer and the one or more additional coating layers is 0.5 µm to 200 µm, preferably 2 µm to 50 µm.

Clause 60. The method of any of clauses 1-59, wherein the first coating layer is a polymeric layer.

Clause 61. The method of any of clauses 1-60, wherein the mark is formed by molding, etching, engraving, and combinations thereof.

Clause 62. An optical element comprising:
(a) at least one mark defined on a surface of an optical substrate;
(b) a first coating layer applied over at least a portion of the surface of the optical substrate and the at least one mark; and
(c) one or more additional coating layers over at least a portion of the first coating layer,
wherein,
the first coating layer has a first refractive index and the optical substrate and the mark have a second refractive index,
a difference between the first refractive index and the second refractive index has an absolute value of 0.02 to 0.24, preferably 0.05 to 0.24, or more preferably 0.07 to 0.24.

Clause 63. The optical element of clause 62, wherein one or more additional coating layers have a third refractive index, and wherein a difference between the second refractive index of the optical substrate and the mark and the third refractive index has an absolute value of less than 0.02.

Clause 64. The optical element of clause 62 or 63, wherein the first coating layer covers at least a portion of the mark on the surface of the optical substrate.

Clause 65. The optical element of any of clauses 62-64, wherein the mark is an optical reference mark, an indicia, or a topographical mark.

Clause 66. The optical element of any of clauses 62-65, wherein at least a portion of the mark protrudes from the surface of the optical substrate or wherein at least a portion of the mark is depressed into the surface of the optical substrate.

Clause 67. The optical element of any of clauses 62-66, wherein the first coating layer enhances a visibility of the mark when a source of electromagnetic energy is viewed through the optical element or when the electromagnetic energy is reflected from the optical element, and wherein an absence of the first coating layer reduces or eliminates a visibility of the mark when a source of electromagnetic energy is viewed through the optical element or when the electromagnetic energy is reflected from the optical element.

Clause 68. The optical element of any of clauses 62-67, wherein the first refractive index has a range of 1.37 to 2.14.

Clause 69. The optical element of any of clauses 62-68, wherein the second refractive index has a range of 1.45 to 1.90.

Clause 70. The optical element of any of clauses 62-69, wherein at least one of the first coating layer and the one or more additional coating layers is a mixture of two or more coating compositions.

Clause 71. The optical element of any of clauses 62-70, wherein the first coating layer is selected from single or multi-layer thermoplastic clear films, single or multi-layer crosslinked clear films, and combinations thereof.

Clause 72. The optical element of any of clauses 62-71, wherein the first coating layer includes at least one of a static dye and a photochromic compound.

Clause 73. The optical element of any of clauses 62-72, wherein at least one of the first coating layer and the one or more additional coating layers is on at least one of a concave surface, convex surface, and a planar surface of the optical element.

Clause 74. The optical element of any of clauses 62-73, wherein at least one of the first coating layer and the one or more additional coating layers is applied by a controlled deposition of a coating material in droplet form.

Clause 75. The optical element of clause 74, wherein the controlled deposition of the coating material is performed using a piezo-electric inkjet printing apparatus or a thermal inkjet printing apparatus.

Clause 76. The optical element of clause 74 or 75, wherein at least one of the first coating layer and the one or more additional coating layers is applied at least one of linearly and uniformly.

Clause 76. An optical element obtainable by the method of any of clauses 1 to 61.

These and other features and characteristics of optical articles described herein, as well as the methods of manufacture of such articles, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only. As used in the specification and the claims, the singular form of "a", "an", and "the" include plural referents unless the context clearly dictates otherwise.

DETAILED DESCRIPTION

Figure 1:
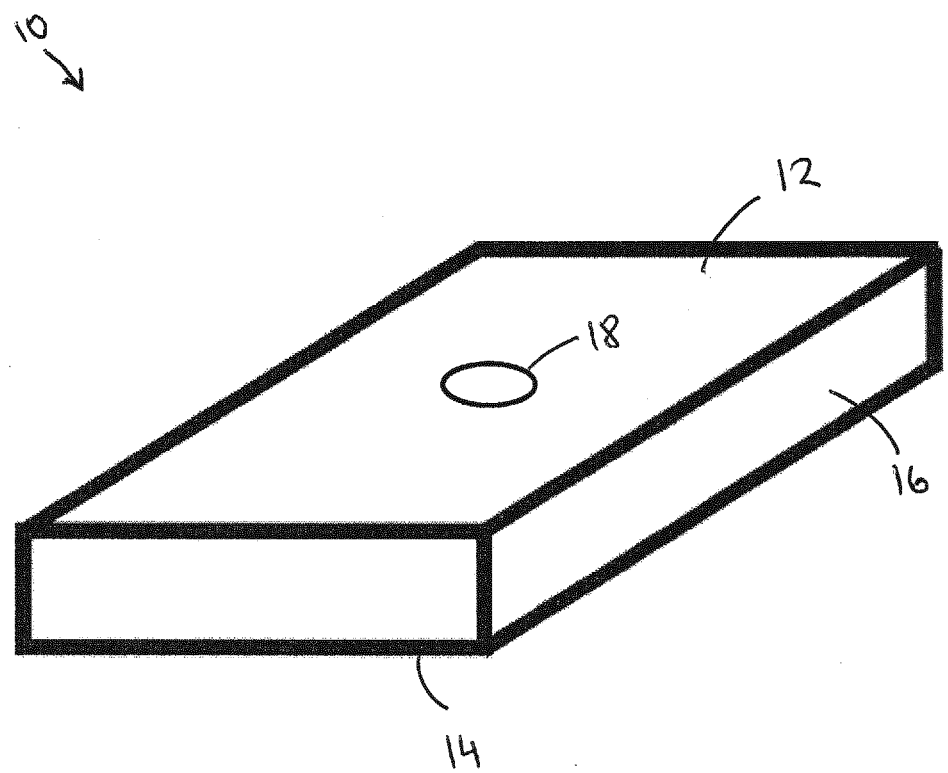
FIG. 1 is a representative partial cross-sectional perspective view of an optical element having a mark and one or more coating layers prepared in accordance with a method of the present invention.

As used herein the term "optical" means pertaining to or associated with light and/or vision. For example, according to various non-limiting aspects disclosed herein, the optical element, article or device can be chosen from ophthalmic elements, articles, and devices, display elements, articles, and devices, windows, and mirrors.

As used herein the term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein the term "ophthalmic substrate" means lenses, partially formed lenses, and lens blanks.

As used herein the term "display" means the visible or machine-readable representation of information in words, numbers, symbols, designs or drawings. Non-limiting examples of display elements, articles and devices include screens, and monitors.

As used herein the term "coating" means a supported film derived from a flowable composition, which may or may not have a uniform thickness, and specifically excludes polymeric sheets.

As used herein the term "sheet" means a pre-formed film having a generally uniform thickness and capable of self-support.

As used herein the refractive index values of the cured coating layers are determined by the Becke Line Method, which entails matching the refractive index of finely cut strips of the cured composition with immersion liquids of known refraction properties. The test is performed under a microscope at 23° C. and with light having a wavelength of 589 nm. Series A-1 Refractive Index Liquids, supplied by Cargill Labs, are used as the immersion liquids and have a refractive index interval of 0.002 between specimens. The Becke Line Method is well-known in the art. A description of the method is found in Grellmann, Wolfgang; Seidler, Sabine. (2013). Polymer Testing (2nd Edition). Hanser Publishers, pp 308-309. The refractive index of the substrate is also determined using the Becke Line Method. In case of organic polymeric substrates a piece of the substrate is sliced into strips of about 3 microns thickness using a Leica Model RM2155 microtome commercially available from Leica Biosystems. The strips are immersed in the liquids of known refractive properties and the refractive index is determined in the same manner as that of the cured coatings.

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth) acrylic acid" means methacrylic acid and/or acrylic acid.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, the term "a mark" means one or more marks. By "mark" is meant a symbol or sign or area that is visually and/or tactilely distinguishable from the remainder of the optical element.

As used herein, the term "photochromic" and similar terms, such as "photochromic compound" means having an absorption spectrum for at least visible radiation that varies in response to absorption of at least actinic radiation. Further, as used herein the term "photochromic material" means any substance that is adapted to display photochromic properties (i.e. adapted to have an absorption spectrum for at least visible radiation that varies in response to absorption of at least actinic radiation) and which includes at least one photochromic compound.

As used herein, the term "photochromic compound" includes thermally reversible photochromic compounds and non-thermally reversible photochromic compounds. The term "thermally reversible photochromic compounds/materials" as used herein means compounds/materials capable of converting from a first state, for example a "clear state," to a second state, for example a "colored state," in response to actinic radiation, and reverting back to the first state in response to thermal energy. The term "non-thermally reversible photochromic compounds/materials" as used herein means compounds/materials capable of converting from a first state, for example a "clear state," to a second state, for example a "colored state," in response to actinic radiation, and reverting back to the first state in response to actinic radiation of substantially the same wavelength(s) as the absorption(s) of the colored state (e.g., discontinuing exposure to such actinic radiation).

As used herein to modify the term "state," the terms "first" and "second" are not intended to refer to any particular order or chronology, but instead refer to two different conditions or properties. For purposes of non-limiting illustration, the first state and the second state of a photochromic compound of a photochromic layer can differ with respect to at least one optical property, such as but not limited to the absorption of visible and/or UV radiation. Thus, according to various non-limiting aspects disclosed herein, the photochromic compound of a photochromic layer can have a different absorption spectrum in each of the first and second state. For example, while not limiting herein, the photochromic compound of a photochromic layer can be clear in the first state and colored in the second state. Alternatively, the photochromic compound of a photochromic layer can have a first color in the first state and a second color in the second state.

As used herein, the term "photosensitive material" means materials that physically or chemically respond to electromagnetic energy, including, but not limited to, phosphorescent materials and fluorescent materials.

As used herein, the term "non-photosensitive materials" means materials that do not physically or chemically respond to electromagnetic energy, including, but not limited to, static dyes.

Other than in the operating examples, or where otherwise indicated, all numbers expressing quantities of ingredients, reaction conditions, and so forth used in the specification and claims are to be understood as modified in all instances by the term "about."

As used herein, spatial or directional terms, such as "left", "right", "up", "down", "inner", "outer", "above", "below", and the like, relate to various features as depicted in the drawing figures. However, it is to be understood that various alternative orientations can be assumed and, accordingly, such terms are not to be considered as limiting.

As used herein, the terms "formed over", "deposited over", "provided over", "applied over", "residing over", or "positioned over" mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

As used herein, the term "substantially parallel" means a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the term "cured state" means a toughened or hardened state of a coating material to its final configuration brought about electron beams, heat, radiation, such as ultraviolet radiation, and/or chemical additives.

All documents, such as but not limited to issued patents and patent applications, referred to herein, and unless otherwise indicated, are to be considered to be "incorporated by reference" in their entirety.

Optical Element

In various aspects, the present disclosure is generally directed to an optical element 10. The optical element 10 can be selected from ophthalmic articles or elements, display articles or elements, windows, mirrors, active liquid crystal cell articles or elements, and passive liquid crystal cell articles or elements.

Examples of ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intraocular lenses, magnifying lenses, and protective lenses or visors.

Examples of display articles, elements and devices include, but are not limited to, screens, monitors, and security elements, including without limitation, security marks and authentication marks.

Examples of windows include, but are not limited to, automotive and aircraft transparencies, filters, shutters, and optical switches.

With reference to FIG. 1, the optical element 10 has a forward or top surface 12, a rearward or bottom surface 14, and a side surface 16 extending between the top surface 12 and the bottom surface 14. When optical element 10 is an ophthalmic lens, the bottom surface 14 is opposed to the eye of an individual wearing optical element 10, the side surface 16 typically resides within a supportive frame, and the top surface 12 faces incident light (not shown) at least a portion of which passes through optical element 10 and into the individual's eye.

Figure 2A:
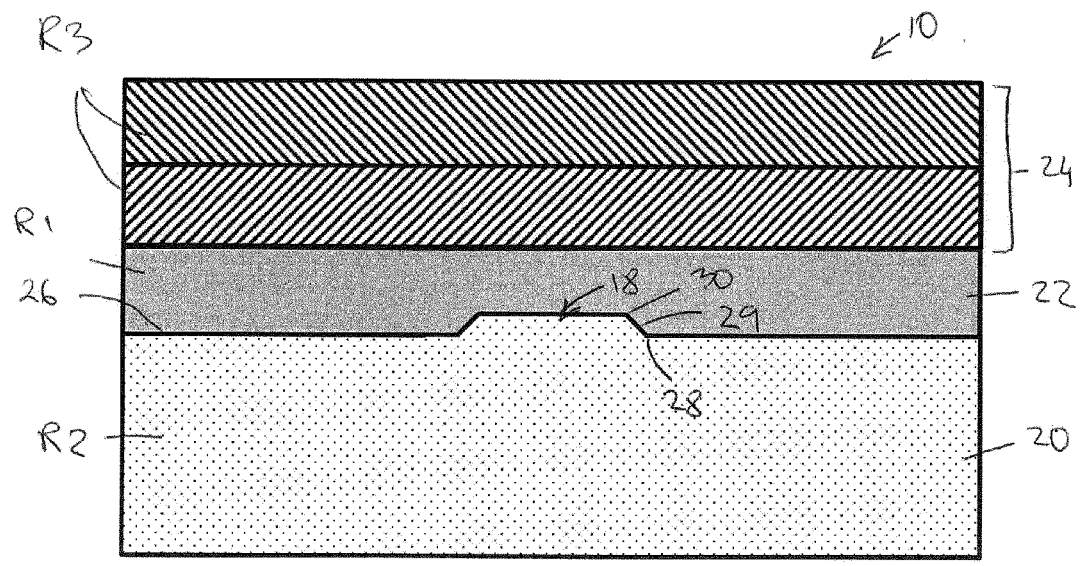
FIG. 2A is a representative cross-sectional side view of an optical element in accordance with one aspect in which the mark protrudes from a surface of an optical substrate.
Figure 2B:
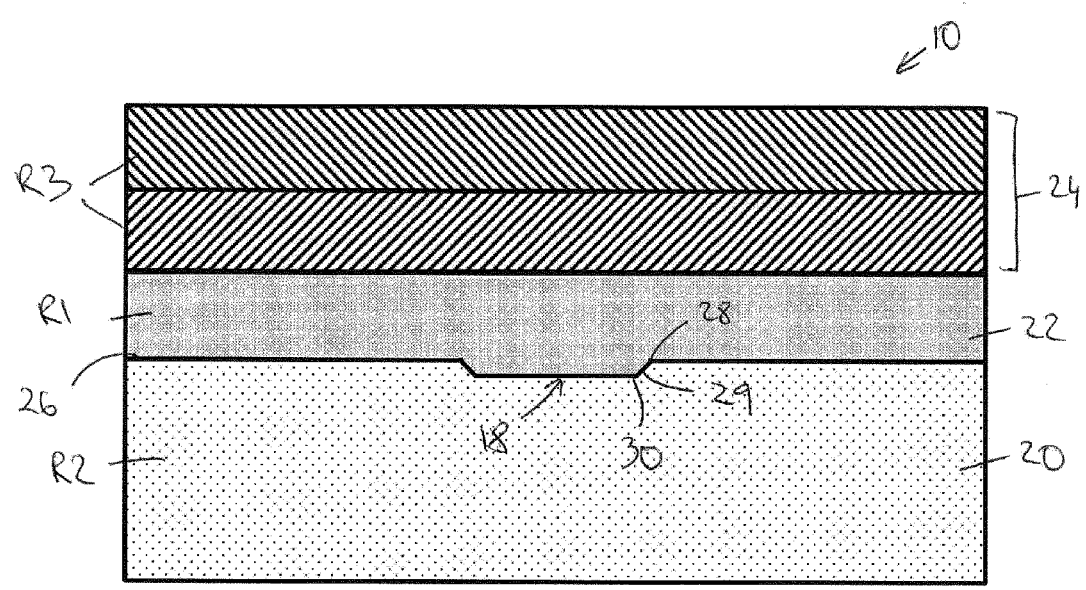
FIG. 2B is a representative cross-sectional side view of an optical element in accordance with one aspect in which the mark is recessed into a surface of an optical substrate.

With some aspects, at least one of the top surface 12, the bottom surface 14, and the side surface 16 may be convex, concave, or planar. At least one indicia, such as a mark 18, may be provided on the optical element 10. With reference to FIGS. 2A-2B, the optical element 10 generally includes an optical substrate 20, such as an optical substrate. The optical element 10 further has a first coating layer 22 applied over at least a portion of a surface of the optical element 10, such as at least one of the top surface 12, the bottom surface 14, and the side surface 16. The optical element 10 further includes one or more additional coating layers 24 applied over at least a portion of the first coating layer 22.

Optical Substrate

In accordance with some aspects of the present invention, the optical element 10 has the optical substrate 20 having an exterior surface 26 that generally defines an overall outer physical shape of the optical element 10. The exterior surface 26 of the optical substrate may define at least a portion of the top surface 12, the bottom surface 14, and/or the side surface 16 of the optical element 10 (shown in FIG. 1). For example, a bottom portion of the exterior surface 26 of the optical substrate 20 may define the bottom surface 14 and the side surface 16 of the optical element 10. In various aspects of the present disclosure, at least a portion of the exterior surface 26 of the optical substrate 20 may have a concave surface, a convex surface, or a planar surface.

In accordance with some aspects, the optical substrate has a refractive index R2 from a minimum of 1.45 to a maximum of 1.90, inclusive of the recited values.

The first coating layer 22 may be applied to the top portion of the exterior surface 26 of the optical substrate 20. In other aspects, various portions of the exterior surface 26 may have a coating layer, such as the first coating layer 22 or one or more additional coating layers 24 applied directly to the exterior surface 26 of the optical substrate 20.

The mark 18 may be provided on a surface of the optical substrate 20. For example, the mark 18 may be provided on the top portion of the exterior surface 26 of the optical substrate 20. The first coating layer 22 may be applied over at least a portion of a surface of the optical substrate 20. The mark 18 may be formed on a concave surface, a convex surface, or a planar surface of the exterior surface 26 of the optical substrate 20.

The optical substrate 20 may include an inorganic material, an organic polymeric material, and combinations thereof. The optical substrate 20 can, with some aspects, be an ophthalmic substrate. Non-limiting examples of organic materials suitable for use in forming ophthalmic substrates include, but are not limited to, the art-recognized polymers that are useful as ophthalmic substrates, such as organic optical resins that are used to prepare optically clear castings for optical applications, such as ophthalmic lenses.

Non-limiting examples of inorganic materials suitable for use in forming the optical substrate 20 of the optical element 10 of the present disclosure include glasses, such as silica based glasses, minerals, ceramics, and metals. For example, in one non-limiting aspect the optical substrate 20 can include glass.

Non-limiting examples of organic materials that can be used to form the optical substrate 20 of the optical element 10 of the present disclosure, include polymeric materials, for example, homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

Mark

Figure 2C:
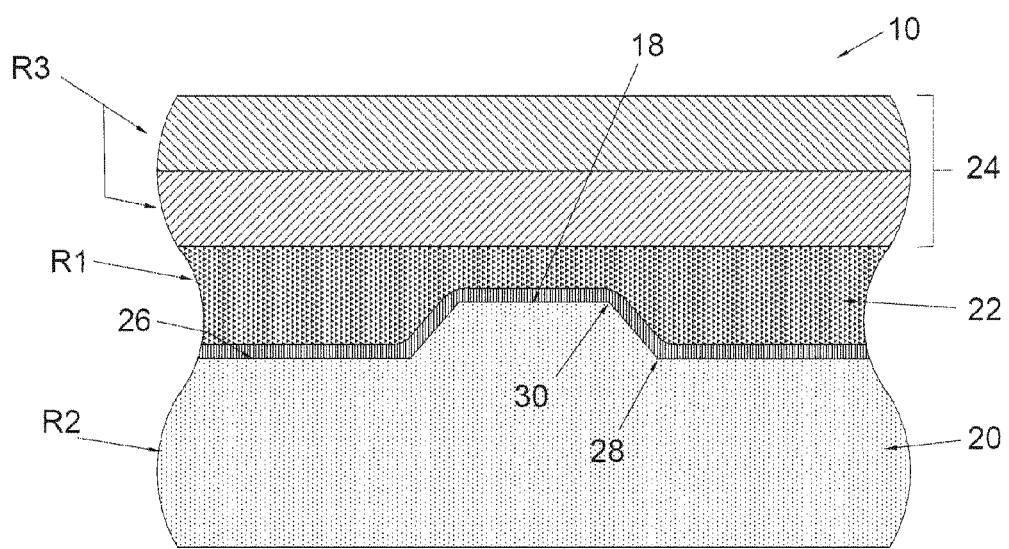
FIG. 2C is a representative cross-sectional side view of an optical element in accordance with one aspect shown with an optional conformal coating applied on a surface of an optical substrate.
Figure 3:
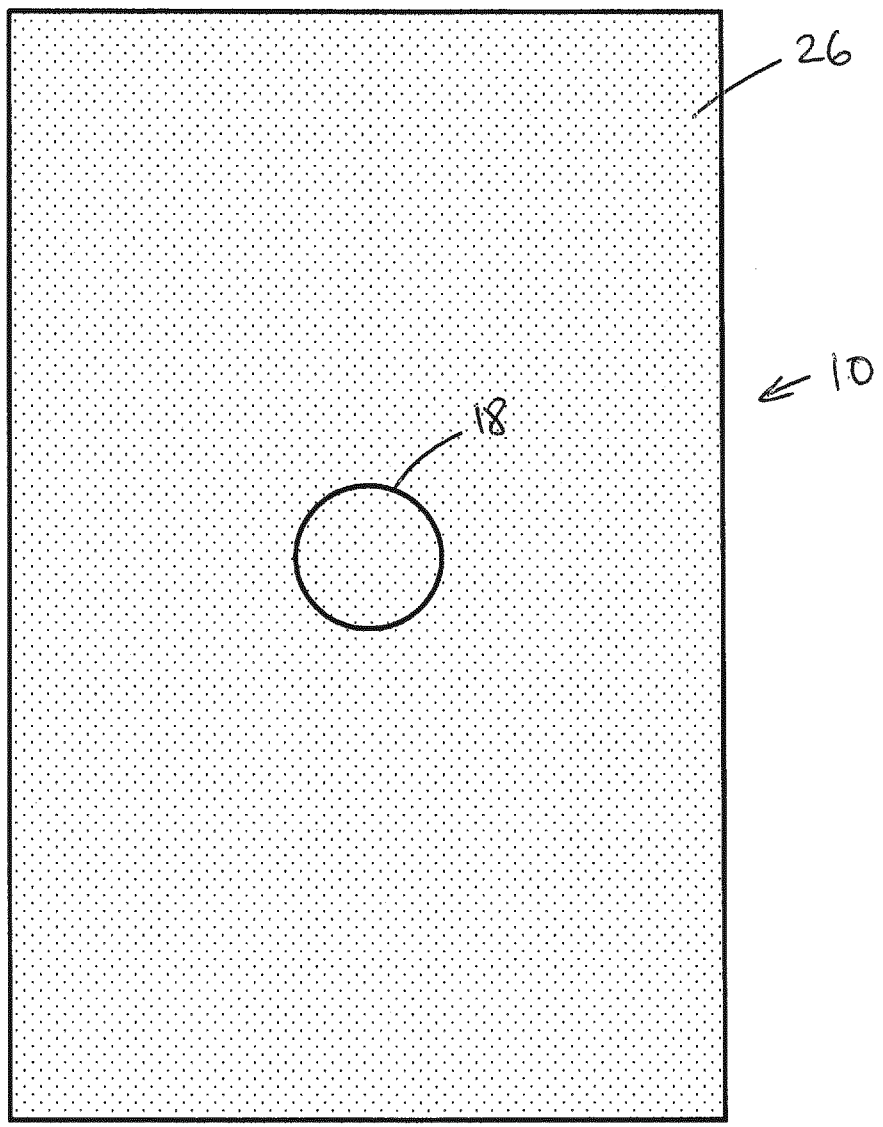
FIG. 3 is a representative top view of the optical element shown in FIG. 1.

As shown in FIGS. 2A-2C, a cross-sectional view of the mark 18, as contemplated by the present disclosure, is formed as a topographical feature that may protrude from the exterior surface 26 of the optical substrate 20 (FIG. 2A), or a topographical feature that is recessed into the exterior surface 26 of the optical substrate 20 (FIG. 2B). In FIG. 2C, an optional thin film conformal coating 21 may coat at least a portion of the exterior surface 26 of the optical substrate 20 and the mark 18. While FIG. 2C shows the mark 18 as a topographical feature that protrudes from the exterior surface 26 of the optical substrate 20, in other aspects the mark 18 may be recessed into the exterior surface 26 of the optical substrate 20, such as shown in FIG. 2B. In some aspects, the mark 18 is monolithically formed with the optical substrate 20.

The overall shape of the mark 18 displays a pattern formed at or near the exterior surface 26 of the optical substrate 20. For example, in some aspects, the mark 18 may be shaped to define an optical reference mark that a practitioner may use as a reference point in matching a power of the optical element 10 to a wearer's prescription. In other aspects, the mark 18 may be an indicia, such as a logo. The mark 18 may be formed as an array of a plurality of individual marks 18 that, taken together, define the boundaries of a logo. Where a plurality of marks 18 are provided on the exterior surface 26 of the optical substrate 20, the plurality of marks 18 may be provided in same plane or offset planes. The method of the present invention can be used to form marks 18 in the form of patterns and designs. Examples of patterns and designs include, but are not limited to, letters and numbers from one or more languages. With some aspects, the mark 18 is in the form of, or a plurality of marks 18 together define, a one-dimensional barcode and/or a two dimensional barcode. In accordance with some aspects, the mark 18 has a refractive index that is the same as the refractive index of the optical substrate 20.

It is believed that the pattern creates the conditions necessary for light to be bent in complex ways leading to areas of reflectance and absorbance. The topographical nature of the mark 18 causes a series of shadowed clear areas which contrast sharply with the remaining surface of the optical substrate 20. When the optical element 10, such as an eyeglass lens, is held in ambient light (naturally occurring light or artificial light), the enhanced indicium has been shown to be easily visible, as further detailed herein.

With continued reference to FIGS. 2A-2B, the mark 18 has a first end 28 that is coextensive with the exterior surface 26 of the optical substrate 20. A second end 30 of the mark 18 extends relative to the first end 28 in a direction protruding outward from the exterior surface 26 of the optical substrate 20 (FIG. 2A), or in a direction recessed into the exterior surface 26 of the optical substrate 20 (FIG. 2B). In accordance with some aspects, one or more marks 18 independently have a depth (recessed into the exterior surface 26 of the optical substrate 20) or height (protruding from the exterior surface 26 of the optical substrate 20) of from a minimum of 0.5 to a maximum of 8 micrometers, such as from 1 to 6 micrometers, or from 2 to 4 micrometers, inclusive of the recited values relative to exterior surface 26 of optical substrate 20. A depth of the one or more marks 18 may depend on an etching process selected to form a depressed mark 18 in the exterior surface 26 of the optical substrate 20. The width of one or more marks 18, with some aspects, is from a minimum of 40 to a maximum of 200 micrometers, such as from 50 to 150 micrometers, or from 75 to 125 micrometers, inclusive of the recited values. The mark 18 may have a combination of surfaces that have a depth and a height relative to the exterior surface 26 of the optical substrate 20. Where a plurality of marks 18 is provided, one or more marks 18 may have a depth and/or height different from that of other marks 18. Various dimensions of the one or more marks 18, including the depth, height, and width can be determined in accordance with art-recognized methods. In some aspects, a confocal laser scanning microscope is used with some aspects to determine the dimensions of the one or more marks 18.

The first end 28 and the second end 30 can each independently be defined by a sidewall surface 29 having a shape selected from polygonal shapes, arcuate shapes, irregular shapes, and combinations thereof. Examples of polygonal shapes include, but are not limited to triangles, rectangles, squares, pentagons, hexagons, heptagons, octagons, portions thereof, such as a V-shape, and combinations thereof. Examples of arcuate shapes include, but are not limited to, spherical shapes, oval shapes, portions thereof, and combinations thereof. For purposes of further non-limiting illustration, examples of a combination of a polygonal shape and an arcuate shape include U-shapes. The sidewall surface 29 extends between the first end 28 and the second end 30. The sidewall surface 29 may be linear or curvilinear, and may extend perpendicularly, at an obtuse angle, or at an acute angle relative to a surface defined by the first end 28 and the second end 30.

With some aspects of the present disclosure, the surface of the optical element 10, onto which the one or more marks 18 are formed, is selected from at least one of the top surface 12, a bottom surface 14, and the side surface 16 of the optical element 10.

In some aspects of the present disclosure, one or more marks 18 may be provided on the optical substrate 20 in a number of ways. For example, one or more marks 18 may be monolithically formed on the optical substrate 20, such as, for example, by molding. In other aspects, one or more marks 18 may be formed on the optical substrate 20 by etching, engraving, or according to other methods known by those skilled in the field to imprint the desired mark 18 on the optical substrate 20. For example, a laser (not shown) emitting a wavelength of 193 to 355 nm and 1064-10,640 nm may be used to engrave the exterior surface 26 of the optical substrate 20. A mask (not shown) may be used in combination with the laser to define the shape of the mark 18.

Coating Layers

In accordance with some further aspects of the present disclosure, the optical element 10 includes the optical substrate 20 having an exterior surface 26 with a mark 18 thereon and a first coating layer 22 applied over at least a portion of the exterior surface 26 and the mark 18. With some aspects, the first coating layer 22 completely covers the mark 18. The first coating layer 22 may be optically clear (without a color hue), or it may have a desired color hue. The first coating layer 22 may be formed on a concave surface, a convex surface, or a planar surface of the exterior surface 26 of the optical substrate 20. The first coating layer 22, with some additional aspects, can include a static dye, a photochromic material, or a combination of two or more thereof, as will be discussed in further detail herein. In accordance with some aspects, the first coating layer 22 is free of static dyes, and photochromic materials.

The method of the present invention further includes forming the first coating layer 22 over at least a portion of the exterior surface 26 of the optical substrate 20. The first coating layer 22 may be formed over the entire exterior surface 26, such as the exterior surface 26 corresponding to the top surface 12 of the optical member 10, with some aspects. The first coating layer 22 may be conformal to the exterior surface 26 and the mark 18, as illustrated in FIG. 2C, or it may form a planar surface over the exterior surface 26 and the mark 18, as illustrated in FIGS. 2A-2B. When the first coating layer 22 is conformal to the exterior surface 26 and the mark 18, the topography of the exterior surface 26 and the mark 18 is maintained on a surface of the first coating layer 22 that is opposite to a surface at the interface between the first coating layer 22 and the exterior surface 26 and the mark 18. The first coating layer 22 is selected such that it enhances the visibility of the mark 18, as described herein. In various aspects, the first coating layer 22 may be applied over at least a portion of the exterior surface 26 of the optical substrate 20 using a variety of coating methods, including, without limitation, spin, spray, dip, flow, curtain, PVD (physical vapor deposition), CVD (chemical vapor deposition), plasma enhanced CVD, evaporation, sputtering, electro-deposition, and printing, such as inkjet printing, as described herein.

The method of the present invention further includes forming one or more additional coating layers 24 over the first coating layer 22. In some aspects, the one or more additional coating layers 24 may be formed over an entire surface of the first coating layer 22. In various aspects, the one or more additional coating layers 24 may be formed on a concave surface, a convex surface, or a planar surface of the exterior surface 26 of the optical substrate 20. The second coating layer 24 may be conformal to the first coating layer 22, or it may form a planar surface over an outer or top surface of the first coating layer 22, as illustrated in FIGS. 2A-2C.

The first coating layer 22 and other optional films and/or layers (such as but not limited to the one or more additional coating layers 24) that are formed on or over the optical element 10 each have clarity at least sufficient so as to allow observance of a source of electromagnetic energy through the optical element 10 and a reflection of the electromagnetic energy incident on a surface of the optical element 10. With some aspects, the first coating layer 22 and one or more additional layers 24 each independently have a percent transmittance of greater than 0% and less than or equal to 100%, such as from 50% to 100%. With additional aspects, the first coating layer 22 and one or more additional coating layers 24 have reflectance at least sufficient so as to allow a reflection of at least a portion of electromagnetic energy incident on the exterior surface of the optical element 10.

With some aspects, the first coating layer 22 has a different refractive index value relative to the refractive index value of the optical substrate 20 and one or more additional coating layers 24. While not intending to be bound by any theory, it is believed that different refractive index values of the first coating layer 22 and the optical substrate 20 and the one or more additional coating layers 24 allow the mark 18 to be observable when a source of electromagnetic energy is viewed through the optical element 10 and/or when the source of electromagnetic energy is reflected from a surface of the optical element 10. In accordance with some aspects, the first coating layer 22 has a first refractive index R1; the optical substrate 20 and the mark 18 on the surface of the optical substrate 20 have a second refractive index R2; and a difference between the first refractive index R1 and the second refractive index R2, in a cured state of the first coating layer 22, has an absolute value of 0.02 to 0.24. With some aspects, the third refractive index R3 of the one or more additional coatings 24 may be substantially the same as the second refractive index R2 of the optical substrate 20 and the mark 18. For example, the absolute value of a difference between the third refractive index R3 and the second refractive index R2, in a cured state of the first coating layer 22 and the one or more additional coating layers 24, may be less than 0.02. The stated difference between the first refractive index R1 and the second refractive index R2 is required whether or not any portion of the first coating layer 22 is diffused into the substrate.

With specific reference to FIG. 2C, the optional thin film coating 21 may coat at least a portion of the exterior surface 26 of the optical substrate 20. Desirably, the thin film coating 21 is interposed between the optical substrate 20 and the first coating layer 22 or is formed at the interface between the optical substrate 20 and the first coating layer 22. In some aspects, the thin film coating 21 may have a refractive index that is the same as the second refractive index R2 of the optical substrate 20. In other aspects, the absolute value of a difference between a refractive index of the thin film coating 21 and the second refractive index R2 of the optical substrate 20 is less than 0.02.

Observing the Mark

As discussed previously herein, the visibility of the mark 18 of the optical element 10 prepared in accordance with the present disclosure and according to the present invention is enhanced when a source of electromagnetic energy is viewed through the optical element 10 relative to the mark 18 or when the source of electromagnetic energy is reflected from a surface of the optical element 10. Observance of the mark 18 can be enhanced, as with some aspects, by the concurrent use of magnification of the mark 18, such as one or more magnifying lenses interposed between the mark 18 and the observer. The source of electromagnetic energy, with some aspects, is a source of visible light, such as natural or artificial light. The source of visible light can, with some aspects, have one or more wavelengths from 380 nanometers to 710 nanometers, inclusive of the recited values.

Figure 4:
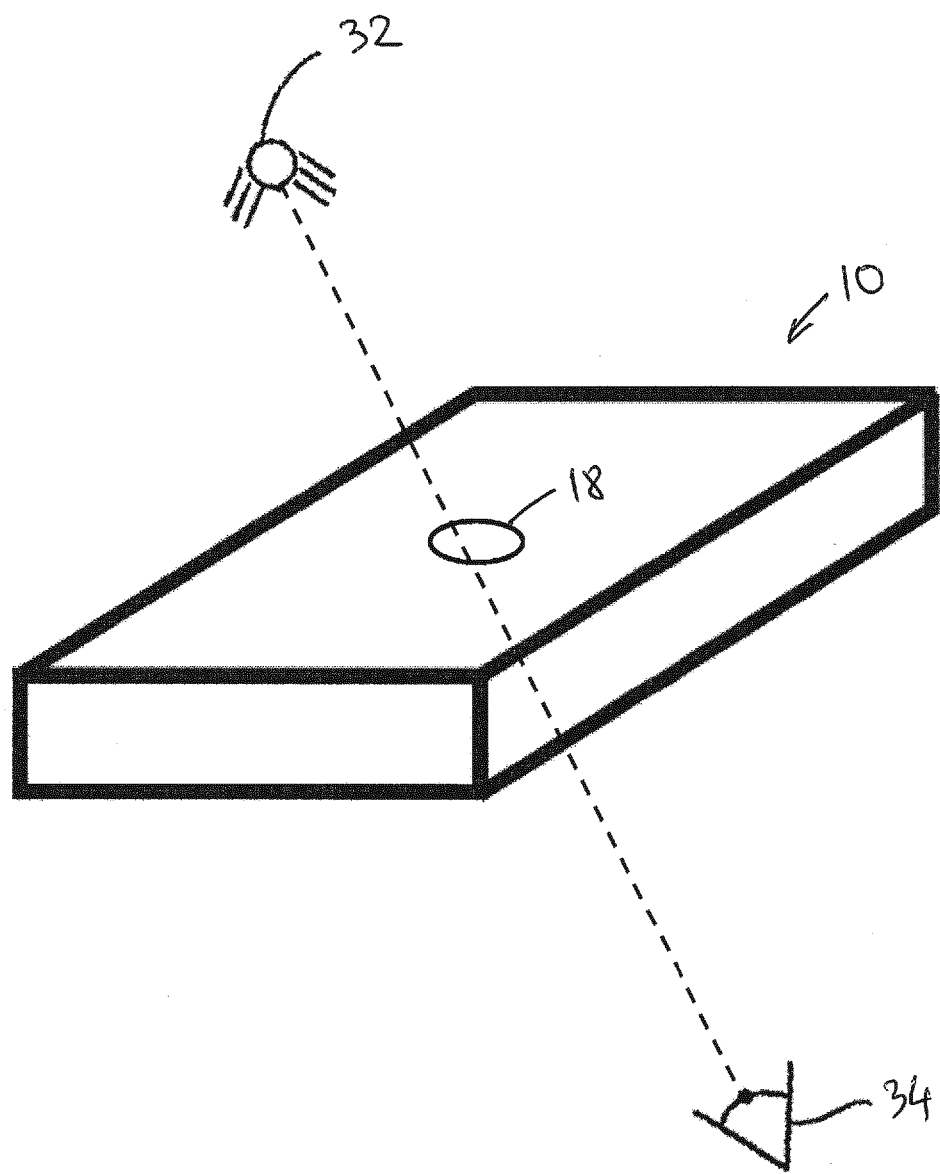
FIG. 4 is a representative perspective schematic view of the relative positioning of a viewer, an optical element, and a source of electromagnetic energy, such that the mark on the optical element is observable.

For purposes of illustrating how, with some aspects, a mark 18 prepared in accordance with the present disclosure can be observed, non-limiting reference is made to FIG. 4, in which an optical element 10 is interposed between a source of electromagnetic energy 32 and an observer 34. The optical element 10 has a surface 36, which can be a top surface 12, the bottom surface 14, or the side surface 16, onto which the mark 18 has been formed in accordance with the method of the present invention. Optical element 10 also includes the first coating layer 22 and the one or more additional coating layers 24 formed over the surface 36 and the mark 18. Observer 34 can be a living observer, such as a human observer, or a non-living observer, such as an electro-optic device.

With further reference to FIG. 4, the observer 34 views the source of electromagnetic energy 32 through optical element 10 or views a reflection of the electromagnetic energy 32 from the surface 36 of the optical element 10. While not intending to be bound by any theory it is believed, based on the evidence at hand, that the mark 18 is observable when the source of electromagnetic energy 32 is viewed through the optical element 10 because the electromagnetic energy is refracted through the first coating layer 22 and the mark 18 in a different manner relative to the electromagnetic energy that passes through the one or more additional coating layers 24 and the optical substrate 20. The difference in the first refractive index R1 (shown in FIGS. 2A-2B) of the first coating layer and the second refractive index R2 (shown in FIGS. 2A-2B) of the optical substrate 20 and the mark 18 enhances the visibility of the mark 18. In the absence of the first coating layer 22 or if the difference in the first refractive index R1 of the first coating layer and the second refractive index R2 of the optical substrate 20 and the mark 18 has an absolute <0.02, the visibility of the mark 18 is diminished. The benefit of the first coating layer 22 having a difference in the first refractive index R1 from the second refractive index R2 of the optical substrate 20 and the mark 18 of >0.02 is that any subsequent coatings can have the same refractive index as the substrate and the mark 18 still will be visible. With some aspects, increasing the visibility of the mark 18 against the surrounding surface of the optical element 10 may be helpful to a practitioner who must check and match the power of the lens according to a wearer's prescription. For example, symbols representing lens power and other identifying information useful to the practitioner may be marked on the lens in the form of the mark 18. With other aspects, a highly visible mark 18 of the present disclosure may be useful to the lens quality control personnel responsible for inspection of lenses. When the lens having the indicium of the present invention is inspected in the presence of a source of electromagnetic energy, the mark 18 is easily identifiable against the surrounding surface of the optical element 10. The mark 18 thus may be spotted quicker and easier during the inspection. Various methods of detecting marks on lenses are disclosed in U.S. Pat. Nos. 5,100,232; 5,960,550; and 5,100,232.

Coating Process

In various aspects of the present disclosure, the first coating layer 22 and/or the one or more additional coating layers 24 can be applied to the optical substrate 20 using any method known by the skilled person, such as spin, spray, dip, flow, curtain, PVD (physical vapor deposition), CVD (chemical vapor deposition), plasma enhanced CVD, evaporation, sputtering and electro-deposition. Examples of coatings methods may be found in U.S. Pat. Nos. 6,352,747 and 7,757,629. In some aspects, the first coating layer 22 and/or the one or more additional coating layers 24 can be applied to the optical substrate 20 using a printing apparatus, such as an inkjet printing apparatus.

The printing apparatus, such as an inkjet printing apparatus, applies a coating material in the form of extremely fine droplets on a printing surface, such as one or more surfaces of the optical substrate 20. A discharge apparatus associated with the printing apparatus, such as one or more print heads, has one or more nozzles associated therewith. Each of the nozzles is configured to controllably discharge a single droplet of the coating material, either continuously or on-demand. In the on-demand system, the discharge of droplets is controlled by a controller having pre-determined droplet discharge profile. For example, the controller may control the size of the drop (volume of coating material) and the speed at which the drop is formed and delivered. In some aspects, the one or more print heads may be provided with one or more piezoelectric elements that provide a mechanism for forming and discharging the droplets from the one or more print heads. A voltage applied to the one or more piezoelectric elements, such as a control voltage determined by the controller, changes the shape of the one or more piezoelectric elements, thereby generating a pressure pulse in the coating material, which forces a droplet of the coating material from the nozzle. In other aspects, the one or more print heads may have at least one chamber including a heater. A droplet is ejected from the chamber when a pulse of voltage is passed across the heater, such as a control voltage determined by the controller. Such a voltage differential causes a rapid vaporization of the coating material in the chamber and forms a bubble. Formation of the bubble causes a pressure differential within the chamber, thereby propelling a droplet of the coating material onto the coating surface. The controller directs one or more print heads to generate droplets on demand. In this manner, the timing, position, and volume of coating material delivered per unit of area of the printing surface can be controlled.

Each droplet discharged from the nozzle of the print head is deposited on the printing surface in the form of a single dot. Thus, assembly of deposited droplets creates an array that enables a pattern to be formed. In this manner, all or portions of the printing surface may be coated. When one or more portions of the printing surface are printed, various designs, such as characters, numbers, images, or the like, may be formed on the printing surface. When the entire printing surface is printed, the assembly of deposited droplets forms a layer of the coating composition on the printing surface, such as the optical substrate 20.

Figure 5:
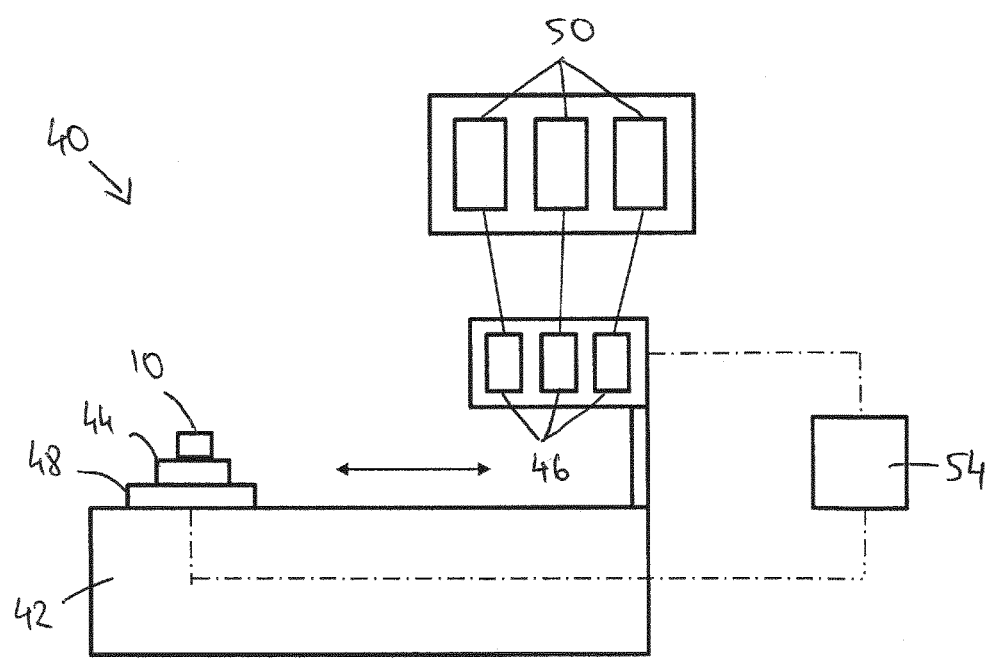
FIG. 5 is a representative schematic side view of a printing apparatus for printing one or more coating layers on an optical substrate in accordance with a method of the present invention.

With reference to FIG. 5, the printing apparatus 40 includes a housing 42 having a workpiece holder 44 and one or more print heads 46. In some aspects, the workpiece holder 44 may be configured to securely retain the optical element 10 during the printing operation. In some aspects, the workpiece holder 44 may be configured to retain a frame, such as an eyeglass frame, having the optical element 10 mounted therein. The workpiece holder 44 may be attached to a movable base 48 that moves the workpiece holder 44, along with the optical substrate 20 secured thereto, relative to the one or more print heads 46. The movable base 48 may be movable in a linear direction in one, two, or three axes.

Additionally, or in the alternative, the movable base 48 may be rotatable about one, two, or three axes. In this manner, the movable base 48 may have up to six degrees of freedom to move the workpiece holder 44 relative to the one or more print heads 46 in order to position the optical substrate 20 in a predetermined position relative to the one or more print heads 46. The movable base 48 may be moved manually, or its movement may be controlled by one or more motors. In other aspects, the workpiece holder 44 may be stationary, while the one or more print heads 46 are provided with a movable base 48 to move the one or more print heads 46 relative to the workpiece holder 44. Each print head 46 may be movable independently of any other print head 46. Similar to the workpiece holder 44, the one or more print heads 46 may be movable in up to six directions (translation in three axes and rotation about three axes). In further aspects, both the workpiece holder 46 and the one or more print heads 46 may be movable on a movable base 48. An uncoated optical substrate 20 may be loaded into the workpiece holder 44 prior to coating the surface of the optical substrate 20 using the one or more print heads 46. The coated optical substrate 20 may then be removed from the workpiece holder 46 to allow a subsequent, uncoated optical substrate 20 to be loaded. In some aspects, a plurality of workpiece holders 46 (not shown) may be provided on a continuously moving movable base 48 such that a plurality of optical substrates 20 may be coated in a continuous process.

Each print head 46 is in fluid communication with a storage reservoir 50. When the printing apparatus 40 has more than one print head 46, individual storage reservoirs 50 may be provided for each print head 46. Each storage reservoir 50 is configured to store a coating material 52 to be delivered to the one or more print heads 46. In this manner, it is possible to print a plurality of different coating materials at the same time by using a plurality of print heads 46 to generate various coatings and colors. Thus, the first coating layer 22 and/or the one or more additional coating layers 24 may be formed as a mixture of two or more coating compositions. In other aspects, the first coating layer 22 and/or the one or more additional coating layers 24 may be formed from a single coating composition applied in one or more successive layers. Various additional devices, such as heaters, mixers, or the like, may be associated with each storage reservoir 50 for preparing the coating material prior to delivery to the one or more print heads 46. In some aspects, viscosity of the coating material may be controlled, such as by increasing or reducing the viscosity of the coating material, prior to loading the coating material into the storage reservoir 50. In another aspect, heating of the coating material within print head manifold or reservoir also may be used to control coating viscosity prior to delivering the coating material to the substrate.

Figure 6:
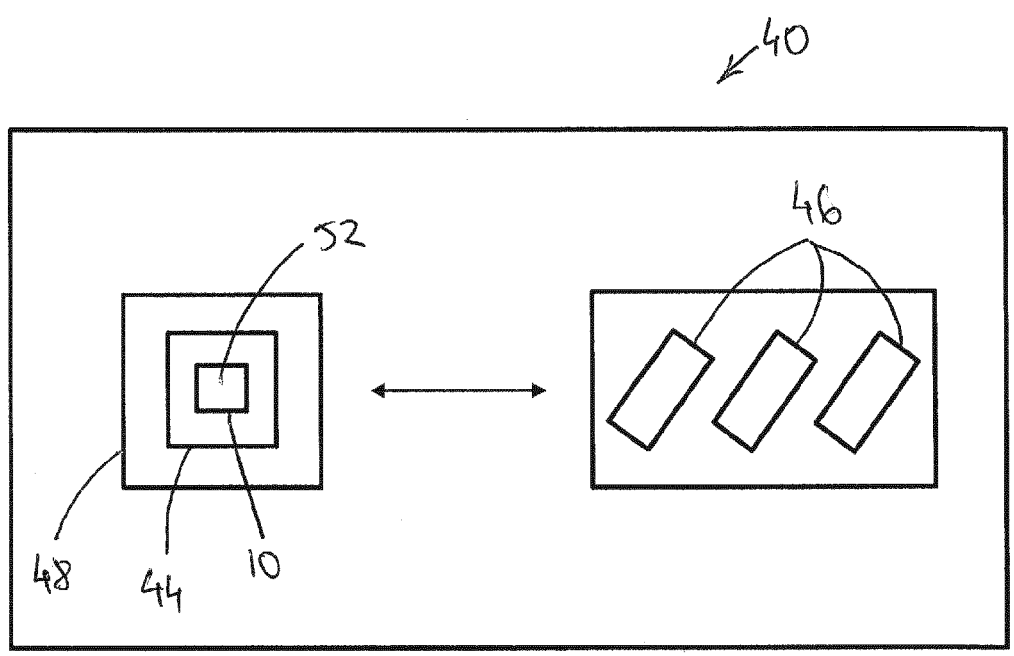
FIG. 6 is a representative schematic top view of the printing apparatus shown in FIG. 5.

With reference to FIG. 6, a plurality of print heads 46 may be arranged in an array. The plurality of print heads 46 may be arranged parallel to one another in a direction that is angled relative to a direction in which the optical substrate 20 is moved relative to the print heads 46. Offsetting the print heads 46 at an angle relative to the direction in which the optical substrate 20 is moved relative to the print heads 46 allows a complete coverage of optical substrates 20 of various shapes and sizes. In other aspects, the print heads 46 may be arranged linearly next to one another in a direction substantially parallel or perpendicular to the direction in which the optical substrate 20 is moved relative to the print heads 46. The print heads 46 may be offset from one another at a distance from a minimum of 0.001 mm to a maximum of 0.254 mm, preferably from 0.82 mm to 0.127 mm. In other aspects, a distance between the optical substrate 20 and nozzle of each print head 46 may be from a minimum of 0.1 mm to a maximum of 10 mm, preferably from 1 mm to 3 mm. During the printing process, the coating material, such as the coating material used to apply the first coating layer 22 or the one or more additional coating layers 24 (shown in FIGS. 2A-2B) may be applied on the optical substrate 20 in a single pass in which the optical substrate 20 is held stationary and the one or more print heads 46 are moved, or in which the optical substrate 20 is moved and the one or more print heads 46 are held stationary, or in which both the optical substrate 20 and the one or more print heads 46 are moved. The single pass may be performed using a single print head 46 or multiple print heads 46. In some aspects, the coating material may be applied on the optical substrate 20 in two or more passes in which the optical substrate 20 is held stationary and the one or more print heads 46 are moved, or in which the optical substrate 20 is moved and the one or more print heads 46 are held stationary, or in which both the optical substrate 20 and the one or more print heads 46 are moved. Two or more passes may be performed using a single print head 46 or multiple print heads 46.

In various aspects, the one or more print heads 46 may be controlled to apply uniform or non-uniform thickness of a coated layer. For example, with reference to FIG. 6, the one or more print heads 46 may apply a coating having a substantially uniform thickness over an entire printed surface 52 of the optical substrate 20. In various aspects, a thickness of the coated layer on the printed surface 52 may be from a minimum of 0.5 μm to a maximum of 200 μm, preferably 2 μm to 50 μm. A density of droplets of the coating material deposited on the printed surface 52 may between a minimum of 100 droplets-per-inch to a maximum of 1200 droplets-per-inch. In various aspects, application quantity may be controlled in various regions of the optical substrate 20 to account for movement of the coating material on a curved surface of the optical substrate 20. For example, on a convex optical substrate 20, the application quantity of the coating material on radially inner portion of the optical substrate 20 may be higher than an application quantity of the coating material on radially outer portion of the optical substrate 20 in order to form a coating layer having a uniform thickness. In other aspects, the coating layer may have a non-uniform thickness on various portions of the optical substrate 20.

Referring back to FIG. 5, the printing apparatus 40 may have a controller 54 for controlling the operation of the printing apparatus 40. The controller 54 may be configured for controlling the printing operations of the one or more print heads 46 and/or movement operations of the optical substrate 20 and/or the one or more print heads 46. In addition, the controller 54 may be configured to control the filling and delivery operations of the coating material in the one or more storage reservoirs 50. For example, the controller 54 may include a variety of discrete computer-readable media components for controlling the printing and/or movement operations. For example, this computer-readable media may include any media that can be accessed by the controller 54, such as volatile media, non-volatile media, removable media, non-removable media, transitory media, non-transitory media, etc. As a further example, this computer-readable media may include computer storage media, such as media implemented in any method or technology for storage of information, such as computer-readable instructions, data structures, program modules, or other data; random access memory (RAM), read only memory (ROM), electrically erasable programmable read only memory (EEPROM), flash memory, or other memory technology; CD-ROM, digital video disks (DVDs), or other optical disk storage; magnetic cassettes, magnetic tape, magnetic disk storage, or other magnetic storage devices; or any other medium which can be used to store the desired information and which can be accessed by the controller 54. Further, this computer-readable media may include communications media, such as computer-readable instructions, data structures, program modules, or other data in a modulated data signal, such as a carrier wave or other transport mechanism and include any information delivery media, wired media (such as a wired network and a direct-wired connection), and wireless media (such as acoustic signals, radio frequency signals, optical signals, infrared signals, biometric signals, bar code signals, etc.). Of course, combinations of any of the above should also be included within the scope of computer-readable media.

Figure 7:
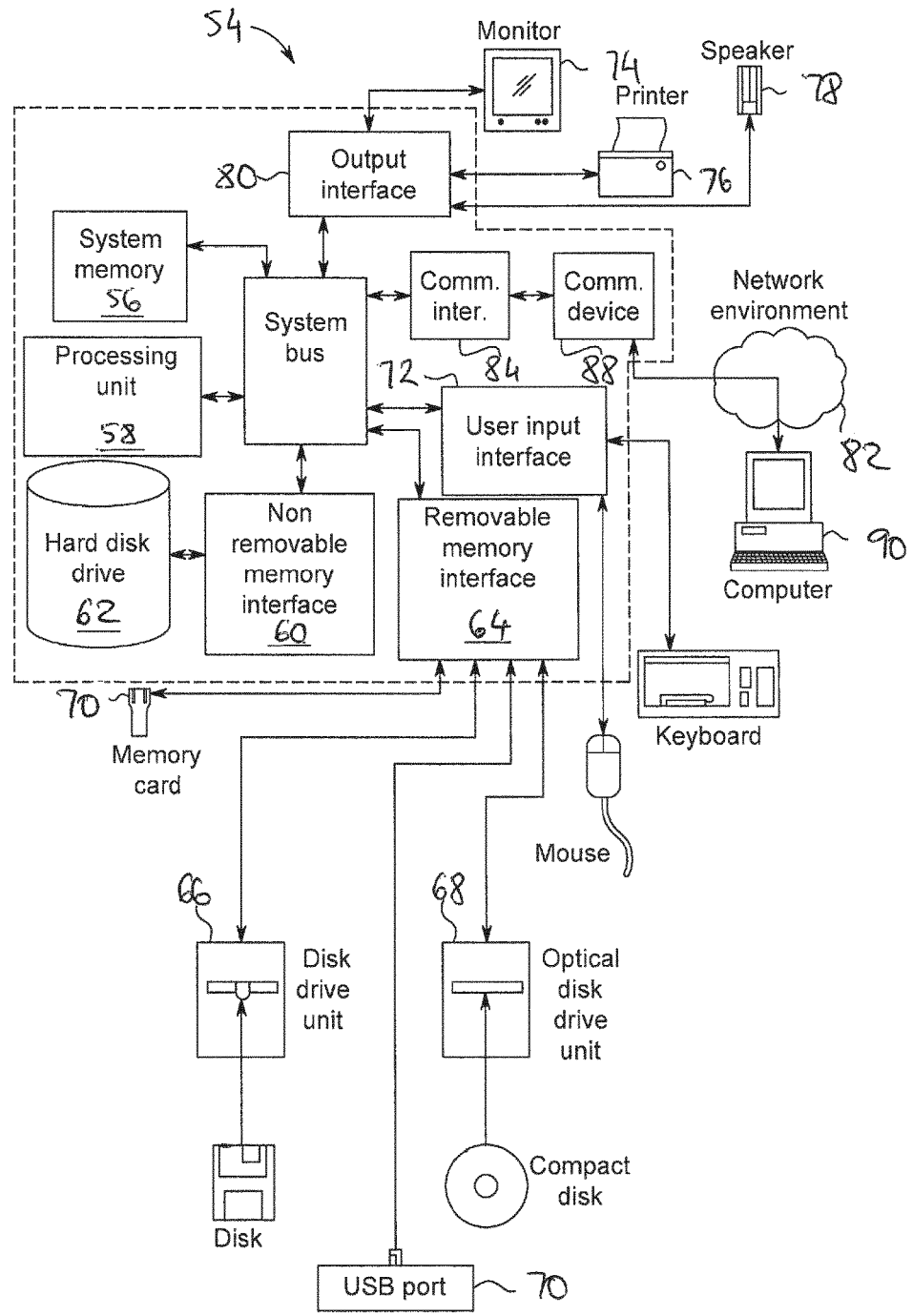
FIG. 7 is a representative schematic view of a controller for controlling an operation of the printing apparatus shown in FIGS. 6-7; and In FIGS. 1-7 the same characters represent the same components unless otherwise indicated.

With reference to FIG. 7, the controller 54 further includes a system memory 56 with computer storage media in the form of volatile and non-volatile memory, such as ROM and RAM. A basic input/output system (BIOS) with appropriate computer-based routines assists in transferring information between components within the controller 54 and is normally stored in ROM. The RAM portion of the system memory 56 typically contains data and program modules that are immediately accessible to or presently being operated on by the processing unit 58, e.g., an operating system, application programming interfaces, application programs, program modules, program data, and other instruction-based computer-readable codes.

With continued reference to FIG. 7, the controller 54 may also include other removable or non-removable, volatile or non-volatile, transitory or non-transitory computer storage media products. For example, the controller 54 may include a non-removable memory interface 60 that communicates with and controls a hard disk drive 62, e.g., a non-removable, non-volatile magnetic medium; and a removable, non-volatile memory interface 64 that communicates with and controls a magnetic disk drive unit 66 (which reads from and writes to a removable, non-volatile magnetic disk), an optical disk drive unit 68 (which reads from and writes to a removable, non-volatile optical disk, such as a CD ROM), a Universal Serial Bus (USB) port 70 for use in connection with a removable memory card, etc. However, it is envisioned that other removable or non-removable, volatile or non-volatile computer storage media can be used in the exemplary computing system environment, including, but not limited to, magnetic tape cassettes, DVDs, digital video tape, solid state RAM, solid state ROM, etc. These various removable or non-removable, volatile or non-volatile magnetic media are in communication with the processing unit 58 and other components of the controller 54 via the system bus. The drives and their associated computer storage media, discussed above and illustrated in FIG. 7, provide storage of operating systems, computer-readable instructions, application programs, data structures, program modules, program data, and other instruction-based, computer-readable code for the controller 54 (whether duplicative or not of this information and data in the system memory 56).

A user may enter commands, information, and data, such as information relating to an art form file of a desired printed layer, into the controller 54 through certain attachable or operable input devices via a user input interface 72. Of course, a variety of such input devices may be utilized, e.g., a microphone, a trackball, a joystick, a touchpad, a touchscreen, a scanner, etc., including any arrangement that facilitates the input of data and information to the controller 54 from an outside source. As discussed, these and other input devices are often connected to the processing unit 58 through the user input interface 72 coupled to the system bus, but may be connected by other interface and bus structures, such as a parallel port, game port, or a USB. Still further, data and information can be presented or provided to a user in an intelligible form or format through certain output devices, such as a monitor 74 (to visually display this information and data in electronic form), a printer 76 (to physically display this information and data in print form), a speaker 78 (to audibly present this information and data in audible form), etc. All of these devices are in communication with the controller 54 through an output interface 80. It is envisioned that any such peripheral output devices be used to provide information and data to the user.

The controller 54 may operate in a network environment 82 through the use of a communications device 84, which is integral to the controller 54 or remote therefrom. This communications device 84 is operable by and in communication with the other components of the controller 54 through a communications interface 88. Using such an arrangement, the controller 54 may connect with or otherwise communicate with one or more remote computers, such as a remote computer 90, which may be a personal computer, a server, a router, a network personal computer, a peer device, or other common network nodes, and typically includes many or all of the components described above in connection with the controller 54. Using appropriate communication devices 84, e.g., a modem, a network interface or adapter, etc., the computer 90 may operate within and communicate through a local area network (LAN) and a wide area network (WAN), but may also include other networks such as a virtual private network (VPN), an office network, an enterprise network, an intranet, the Internet, etc.

As used herein, the controller 54 includes, or is operable to execute appropriate custom-designed or conventional software to perform and implement the processing steps of the method and system of the present disclosure, thereby forming a specialized and particular computing system. Accordingly, the presently-invented method and system may include one or more controllers 54 or similar computing devices having a computer-readable storage medium capable of storing computer-readable program code or instructions that cause the processing unit 58 to execute, configure, or otherwise implement the methods, processes, and transformational data manipulations discussed herein in connection with the present disclosure. Still further, the controller 54 may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

It will be apparent to one skilled in the relevant arts that the system may utilize databases physically located on one or more computers which may or may not be the same as their respective servers. For example, programming software on controller 54 can control a database physically stored on a separate processor of the network or otherwise.

[Pre-Treatment Step]

In the method for producing the optical element 10 in accordance with the present disclosure, the optical substrate 20 may be subjected to a pre-treating step prior to coating the optical substrate 20 with the first coating layer 22. In this pre-treating step, at least a portion of the optical substrate 20 may be subjected to a corona treatment. Pre-treatments may include, without limitation, plasma, flame, chemical (e.g. caustic) or any treatment for raising the surface energy of the substrate so that the first coating wets the optical substrate and promotes adhesion to the optical substrate. For example, the optical substrate may be treated with a corona discharge from a Tantec EST-Electrical Service Treatment unit operating at 500 Watts and 54 kVA for 30 to 90 seconds to activate the surface of the substrate, as described in U.S. Pat. No. 8,608,988.

[Curing Step]

In the method for producing the optical element 10 in accordance with some aspects of the present disclosure, the first coating layer 22 and/or one or more additional coating layers 24, may be cured, such as by heating or exposure to radiation such as ultraviolet (UV) radiation. In various other aspects, the curing step may include, in addition or in the alternative to the heating and radiation treatments described herein, exposing at least a portion of the first coating layer 22 and/or one or more additional coating layers 24 to electron beam radiation, microwave radiation, or other methods for curing the coating composition.

[Leveling Step]

In the method for producing the optical element 10 in accordance with the present disclosure, the first coating layer 22 and/or one or more additional coating layers 24 may be leveled to assure a uniform thickness of the first coating layer 22 and/or one or more additional coating layers 24. Leveling may be performed concomitant with the printing operation, or after the printing operation is completed. A leveling device may be used to level the first coating layer 22 and/or one or more additional coating layers 24. Furthermore, leveling may be prior, concomitant, or after any additional post-processing steps after the first coating layer 22 and/or one or more additional coating layers 24 are printed. In some aspects, the leveling step may include vibrating the optical element 10. Vibration of the optical element 10 may be performed linearly, for example in the form of reciprocal movement along one axis. In other aspects, vibration of the optical element 10 may be performed linearly along two axes, such as vibrating the optical element 10 linearly in one plane. In some aspects, the leveling step may include vibrating the optical element 10 at a frequency of 10 Hz to 110 Hz. Furthermore, the leveling step may include vibrating the optical element 10 for 3 seconds to 30 seconds.

Coating Layer Examples

In various aspects, the first coating layer 22 is selected to have a refractive index with an absolute value difference from the refractive index of the substrate 20 of at least 0.02, such as at least 0.05, or such as at least 0.07 and as much as 0.24. Not intending to be bound by any theory, it is believed that the greater the differences in refractive indexes, the more easily visualized the mark. However, differences in refractive indexes exceeding 0.24 may result in visual aberrations such as undesirable reflections, for example in a pair of corrective ophthalmic lenses.

In various aspects, the one or more additional coating layers 24 are selected to have a refractive index (third refractive index) with an absolute value difference from the refractive index of the substrate 20 (first refractive index) of less than 0.02. Not intending to be bound by any theory, one or more additional coating layers having a third refractive index which can be less than 0.02 difference from the first refractive index, such that, in some aspects, when the one or more additional coating layers 24 are applied to the mark or surface of the substrate 20, the mark 18 is not visible.

As described previously herein, the first coating layer 22 and one or more additional coating layers 24 can each independently be a single layered film or a multilayered film. Each layer of the first coating layer 22 and one or more additional coating layers 24 can in each case be independently selected from thermoplastic films, crosslinked films, and combinations thereof. Each layer of the first coating layer 22 and one or more additional coating layers 24 can in each case be independently formed from a polymeric sheet or a coating composition.

Examples of polymeric materials that can be used in forming one or more layers of the first coating layer 22 and one or more additional coating layers 24 include, but are not limited to: polyvinyl alcohol, polyvinyl chloride, polyurethane, polyimide, polyacrylate, and polycaprolactam. With some aspects, one or more polymeric sheet can be a least partially ordered, for example, by unilateral or bilateral stretching.

Coating compositions that can be used to form the one or more layers of the first coating layer 22 and one or more additional coating layers 24 include, with some aspects, a curable resin composition, and optionally a solvent. The coating compositions can be in the form of art-recognized liquid coating compositions and powder coating compositions. The coating compositions can be thermoplastic, radiation curable such as by ultraviolet radiation or electron beam, or thermosetting coating compositions. With some aspects, the coating compositions are selected from curable or thermosetting coating compositions.

The curable resin composition of the curable coating compositions according various aspects that can be used to form one or more layers of the first coating layer 22 and one or more additional coating layers 24 typically include: a first reactant (or component) having functional groups, e.g., an epoxide functional polymer reactant; and a second reactant (or component) that is a crosslinking agent having functional groups that are reactive towards and that can form covalent bonds with the functional groups of the first reactant. The first and second reactants of the curable resin composition can each independently include one or more functional species, and are each present in amounts sufficient to provide cured coatings having a desirable combination of physical properties, e.g., smoothness, optical clarity, solvent resistance and hardness.

Examples of curable resin compositions that can be used with the curable coating compositions include, but are not limited to: curable resin compositions that include an epoxide functional polymer, such as (meth)acrylic polymers containing residues of glycidyl (meth)acrylate, and an epoxide reactive crosslinking agent (e.g., containing active hydrogens, such as hydroxyls, thiols and amines); curable resin compositions that include active hydrogen functional polymer, such as hydroxy functional polymer, and capped (or blocked) isocyanate functional crosslinking agent; curable resin compositions that include active hydrogen functional polymer, such as hydroxy functional polymer, and melamine crosslinking agent; curable polysiloxane coating compositions; and radiation curable compositions that include acrylic functional monomers. Further examples of suitable curable coating compositions are those described hereinbelow as art-recognized hard coat materials.

With some aspects, the curable resin composition of the coating compositions that can be used to form one or more layers of the first coating layer 22 and one or more additional coating layers 24 is a curable urethane (or polyurethane) resin composition. Curable urethane resin compositions useful in forming one or more layers of the first coating layer 22 and one or more additional coating layers 24 typically include: an active hydrogen functional polymer, such as a hydroxy functional polymer; and a capped (or blocked) isocyanate functional crosslinking agent. Hydroxy functional polymers that can be used in such compositions include, but are not limited to, art-recognized hydroxy functional vinyl polymers, hydroxy functional polyesters, hydroxy functional polyurethanes and mixtures thereof.

Vinyl polymers having hydroxy functionality can be prepared by free radical polymerization methods that are known to those of ordinary skill in the art. With some aspects of the present invention, the hydroxy functional vinyl polymer is prepared from a majority of (meth)acrylate monomers and is referred to herein as a "hydroxy functional (meth) acrylic polymer".

Hydroxy functional polyesters useful in curable coating compositions that include capped isocyanate functional crosslinking agents can be prepared by art-recognized methods. Typically, diols and dicarboxylic acids or diesters of dicarboxylic acids are reacted in a proportion such that the molar equivalents of hydroxy groups is greater than that of carboxylic acid groups (or esters of carboxylic acid groups) with the concurrent removal of water or alcohols from the reaction medium.

Hydroxy functional urethanes can be prepared by art-recognized methods. Typically one or more difunctional isocyanates are reacted with one or more materials having two active hydrogen groups (e.g., diols or dithiols), such that the ratio of active hydrogen groups to isocyanate groups is greater than 1, as is known to the skilled artisan.

By "capped (or blocked) isocyanate crosslinking agent" is meant a crosslinking agent having two or more capped isocyanate groups that can decap (or deblock) under cure conditions, e.g., at elevated temperature, to form free isocyanate groups and free capping groups. The free isocyanate groups formed by decapping of the crosslinking agent are typically capable of reacting and forming substantially permanent covalent bonds with the active hydrogen groups of the active hydrogen functional polymer (e.g., with the hydroxy groups of a hydroxy functional polymer).

It is desirable that the capping group of the capped isocyanate crosslinking agent not adversely affect the curable coating composition upon decapping from the isocyanate (i.e., when it becomes a free capping group). For example, it is desirable that the free capping group neither become trapped in the cured film as gas bubbles nor excessively plasticize the cured film. Capping groups useful in the present invention typically have the characteristics of being nonfugitive or capable of escaping substantially from the forming coating prior to its vitrification. Typically, the free capping groups escape substantially from the forming (e.g., curing) coating prior to its vitrification.

Classes of capping groups of the capped isocyanate crosslinking agent can be selected from, include, but are not limited to: hydroxy functional compounds, e.g., linear or branched $C_2$-$C_8$ alcohols, ethylene glycol butyl ether, phenol and p-hydroxy methylbenzoate; 1H-azoles, e.g., 1H-1,2,4-triazole and 1H-2,5-dimethyl pyrazole; lactams, e.g., e-caprolactam and 2-pyrrolidinone; ketoximes, e.g., 2-propanone oxime and 2-butanone oxime. Other suitable capping groups include, but are not limited to, morpholine, 3-aminopropyl morpholine, 3,5-dimethylpyrazole, and N-hydroxy phthalimide.

The isocyanate or mixture of isocyanates of the capped isocyanate crosslinking agent has two or more isocyanate groups (e.g., 3 or 4 isocyanate groups). Examples of suitable isocyanates that can be used to prepare the capped isocyanate crosslinking agent include, but are not limited to monomeric diisocyanates, e.g., α,α'-xylylene diisocyanate, α, α, α', α-tetramethylxylylene diisocyanate and 1-isocyanato-3-isocyanatomethyl-3,5,5-trimethylcyclohexane (isophorone diisocyanate or IPDI), and dimers and trimers of monomeric diisocyanates containing isocyanurate, uretidino, biruet or allophanate linkages, e.g., the trimer of IPDI.

The capped isocyanate crosslinking agent can also be selected from oligomeric capped isocyanate functional adducts. As used herein, by "oligomeric capped polyisocyanate functional adduct" is meant a material that is substantially free of polymeric chain extension. Oligomeric capped polyisocyanate functional adducts can be prepared by art-recognized methods from, for example, a compound containing three or more active hydrogen groups, e.g., trimethylolpropane (TMP), and an isocyanate monomer, e.g., 1-isocyanato-3,3,5-trimethyl-5-isocyanatomethylcyclohexane (IPDI), in a molar ratio of 1:3, respectively. In the case of TMP and IPDI, by employing art-recognized starved feed and/or dilute solution synthesis techniques, an oligomeric adduct having an average isocyanate functionality of 3 can be prepared (e.g., "TMP-3IPDI"). The three free isocyanate groups per TMP-3IPDI adduct are then capped with a capping group, e.g., a linear or branched $C_2$-$C_8$ alcohol.

To catalyze the reaction between the isocyanate groups of the capped polyisocyanate crosslinking agent and the hydroxy groups of the hydroxy functional polymer, one or more catalysts are typically present in the curable photochromic coating composition in amounts of from, for example, 0.1 to 5 percent by weight, based on total resin solids of the composition. Classes of useful catalysts include but are not limited to, metal compounds, in particular, organic tin compounds, e.g., tin(II) octanoate and dibutyltin (IV) dilaurate, tertiary amines, e.g., diazabicyclo[2.2.2]octane, bismuth, and zinc and zirconium carboxylates.

Curable coating compositions that can be used to form one or layers of the first coating layer 22 and one or more additional coating layers 24, which include hydroxy functional polymer and capped isocyanate functional crosslinking agent, typically have present therein hydroxy functional polymer in an amount of from 55 percent to 95 percent by weight, based on total resin solids weight of the composition, e.g., from 75 percent to 90 percent by weight, based on total resin solids weight of the composition. The capped isocyanate functional crosslinking agent is typically present in the curable resin composition in an amount corresponding to the balance of these recited ranges, i.e., 5 to 45, particularly 10 to 25, percent by weight.

With the curable urethane resin compositions that can be used to form one or more layers of the first coating layer 22 and one or more additional coating layers 24, the equivalent ratio of isocyanate equivalents in the capped isocyanate crosslinking agent to hydroxy equivalents in the hydroxy functional polymer is typically within the range of 1:3 to 3:1, e.g., 1:2 to 2:1. While equivalent ratios outside of this range can be employed, they are generally less desirable due to performance deficiencies in the cured films obtained therefrom. Curable coating compositions that include hydroxy functional polymer and capped isocyanate functional crosslinking agent are typically cured at a temperature of from 120° C. to 190° C. over a period of from 10 to 60 minutes.

Coating compositions that can be used to form one or more layers of the first coating layer 22 and one or more additional coating layers 24 can, with some aspects, optionally further include a solvent. Examples of suitable solvents include, but art not limited to, acetates, alcohols, ketones, glycols, ethers, aliphatics, cycloaliphatics and aromatics. Examples of acetates include, but are not limited to, ethyl acetate, butyl acetate, and glycol acetate. Examples of ketones include, but are not limited to, methyl ethyl ketone and methyl-N-amyl ketone. Examples of aromatics include, but are not limited to, are toluene, naphthalene and xylene. In an aspect, one or more solvents are added to each of the first reactant and the second reactant. Suitable solvent blends can include, for example, one or more acetates, propanol and its derivatives, one or more ketones, one or more alcohols and/or one or more aromatics. If present, the solvent is typically present in an amount of from 5 to 60 percent by weight, or 5 to 40 percent by weight, or 10 to 25 percent by weight, based on the total weight of the coating composition (inclusive of the solvent weight).

Curable coating compositions that can be used to form one or more layers of the first coating layer 22 and one or more additional coating layers 24, with some aspects, can include kinetic enhancing additives, photoinitiators, and thermal initiators. With some aspects, the curable coating compositions optionally contain additives for flow and wetting, flow control agents, e.g., poly(2-ethylhexyl)acrylate, adjuvant resin to modify and optimize coating properties, antioxidants and ultraviolet (UV) light absorbers. Examples of useful antioxidants, hindered amine light stabilizers and UV light absorbers include those available commercially from BASF under the trademarks IRGANOX and TINUVIN. These optional additives, when used, are typically present in amounts up to 10 percent by weight (e.g., from 0.05 to 5 percent by weight), based on total weight of resin solids of the curable resin composition.

With some aspects, one or more layers of the first coating layer 22 and one or more additional coating layers 24 can each independently include a static dye, a photochromic material, or a combination thereof. Alternatively or additionally, the optical substrate 20 of the optical element 10 of the present invention can include a static dye, a photochromic material, or a combination thereof. The following description with regard to static dyes and photochromic compounds that can, with some aspects, be present in one or more layers of the first coating layer 22 and one or more additional coating layers 24, is also applicable to static dyes and photochromic compounds that can, with some aspects, be alternatively or additionally present in the optical substrate of the optical element 10 of the present invention.

Classes and examples of static dyes that can be present in one or more layers of the first coating layer 22 and one or more additional coating layers 24 include, but are not limited to, art-recognized inorganic static dyes and organic static dyes.

Classes of photochromic compounds that can be present in one or more layers of the first coating layer 22 and one or more additional coating layers 24 include, but are not limited to, "conventional photochromic compounds." As used herein, the term "conventional photochromic compound" includes both thermally reversible and non-thermally reversible (or photo-reversible) photochromic compounds. Generally, although not limiting herein, when two or more conventional photochromic materials are used in combination with each other, the various materials can be chosen to complement one another to produce a desired color or hue. For example, mixtures of photochromic compounds can be used according to certain non-limiting aspects disclosed herein to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors.

Examples of photochromic materials or compounds that can be present in one or more layers of the first coating layer 22 and one or more additional coating layers 24 include, but are not limited to, indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

Further examples of photochromic compounds, that can be present in one or more layers of the first coating layer 22 and one or more additional coating layers 24, can, with some aspects, be selected from certain indeno-fused naphthopyran compounds, such as described in U.S. Pat. No. 6,296,785, at column 3, lines 66 through column 10, line 51, which disclosure is incorporated herein by reference.

The photochromic compounds, with some aspects, that can be present in one or more layers of the first coating layer 22 and one or more additional coating layers 24, can be covalently bonded to the matrix, such as the organic matrix, of any layer. With some aspects, the photochromic compounds can include one or more reactive groups, such as one or more polymerizable groups. With some aspects, the photochromic compounds can be selected from 2H-naphtho[1,2-b]pyrans, 3H-naphtho[2,1-b]pyrans and/or indeno[2,1-f]naphtho[1,2-b]pyrans each having at least one functional group that is capable of forming a covalent bond with another functional group, such as at least one polymerizable group, such as at least one polyalkoxylated substituent of from 1 to 50 alkoxy units per substituent which is end-capped (or terminated) with a polymerizable group. Examples of such photochromic compounds include, but are not limited to, those disclosed in U.S. Pat. No. 6,113,814, at column 2, line 52 through column 8, line 40, which disclosure is incorporated herein by reference.

The photochromic compounds can be introduced into a particular film, layer, or optical substrate in accordance with art-recognized methods. Such art-recognized methods include, but are not limited to, imbibition, and incorporating the photochromic into a composition from which the particular film, layer or optical substrate is prepared.

The photochromic compounds can be present in one or more layers of the first coating layer 22 and one or more additional coating layers 24, and/or the optical substrate, in amounts (or ratios) such that the optical element of the present disclosure exhibits desired optical properties. For purposes of non-limiting illustration, the amount and types of photochromic compounds can be selected such that the optical element is clear or colorless when the photochromic compounds are in the closed-form (e.g., in the bleached or unactivated state), and can exhibit a desired resultant color when the photochromic compounds are in the open-form (e.g., when activated by actinic radiation). The precise amount of the photochromic compounds that are utilized is not critical, provided that a sufficient amount is used to produce the desired effect. The particular amount of the photochromic compounds used can depend on a variety of factors, such as but not limited to, the absorption characteristics of the photochromic compounds, the color and intensity of the color desired upon activation, and the method used to incorporate the photochromic compounds into a particular layer. Although not limiting herein, according to various non-limiting aspects disclosed herein, the amount of the photochromic compounds that are incorporated into a layer of the optical element can range from 0.01 to 40 weight percent, or from 0.05 to 15, or from 0.1 to 5 weight percent, based on the weight of the layer. The same amounts and ranges are applicable with regard to the amount of the photochromic compounds that are alternatively or additionally incorporated into the optical substrate of the optical element of the present disclosure.

The optical elements prepared by the method of and according to the present disclosure can optionally include one or more layers in addition to the first coating layer 22 and one or more additional coating layers 24. Examples of such additional layers include, but are not limited to: primer coatings and films; protective coatings and films, including transitional coatings and films and abrasion resistant coatings and films; anti-reflective coatings and films; polarizing coatings and films; and combinations thereof. As used herein the term "protective coating or film" refers to coatings or films that can prevent wear or abrasion, provide a transition in properties from one coating or film to another, protect against the effects of polymerization reaction chemicals and/or protect against deterioration due to environmental conditions such as moisture, heat, ultraviolet light, oxygen, etc.

As used herein, the term "transitional coating and film" means a coating or film that aids in creating a gradient in properties between two coatings or films, or a coating and a film. For example, although not limiting herein, a transitional coating can aid in creating a gradient in hardness between a relatively hard coating and a relatively soft coating. Non-limiting examples of transitional coatings include radiation-cured, acrylate-based thin films as described in U.S. Pat. No. 7,452,611 B2, which are hereby specifically incorporated by reference herein.

As used herein the term "abrasion resistant coating and film" refers to a protective polymeric material that demonstrates a resistance to abrasion that is greater than a standard reference material, e.g., a polymer made of CR-39® monomer available from PPG Industries, Inc, as tested in a method comparable to ASTM F-735 Standard Test Method for Abrasion Resistance of Transparent Plastics and Coatings Using the Oscillating Sand Method. Non-limiting examples of abrasion resistant coatings include, for example, abrasion-resistant coatings comprising organosilanes, organosiloxanes, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. Non-limiting examples of commercial hard coating products include CRYSTALCOAT™ 124 and HI-GARD® coatings, available from SDC Coatings, Inc. and PPG Industries, Inc., respectively.

The abrasion resistant coating or film (or hard coat layer) can, with some aspects, be selected from art-recognized hard coat materials, such as organo-silane abrasion-resistant coatings. Organo-silane abrasion-resistant coatings, often referred to as hard coats or silicone-based hard coatings, are well known in the art, and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, lines 58 through column 2, line 8, and column 3, line 52 through column 5, line 50, which disclosures describe organo-silane hard coatings and which disclosures are incorporated herein by reference. Reference is also made to U.S. Pat. Nos. 4,731,264, 5,134,191, 5,231,156, and International Patent Publication WO 94/20581 for disclosures of organo-silane hard coatings, which disclosures are also incorporated herein by reference. The hard coat layer can be applied by art-recognized coating methods such as, but not limited to, roll coating, spray coating, curtain coating, and spin coating.

Non-limiting examples of antireflective coatings and films include a monolayer, multilayer or film of metal oxides, metal fluorides, or other such materials, which can be deposited onto the articles disclosed herein (or onto films that are applied to the articles), for example, through vacuum deposition, sputtering, etc. Non-limiting examples of conventional photochromic coatings and films include, but are not limited to, coatings and films comprising conventional photochromic materials.

Coating Process Examples

Part 1. Determination of Required Refractive Index Difference

A lens with refractive index 1.498, comprising marks of 100 microns width by 0.775 microns high were used. Oils of known refractive index (from Series A-1 Refractive Index Liquids, supplied by Cargill Labs) were applied over the marks to rapidly determine the minimum refractive index difference required to achieve visibility of the mark. A first oil, simulating the first coating layer, was applied by dropper, followed by a second oil of refractive index 1.508 meant to simulate the second coating layer.

After application of the oils, the lens was viewed through a microscope at 12× magnification to determine visibility of the mark. Ease of visibility was noted regarding the required use of a microscope (most difficult) or unmagnified with use of a strip light (a standard fluorescent tube, considered least difficult). The refractive indexes tested, and the ease of visibility are listed in Table 1. The refractive index differential was the difference between the refractive index of the substrate and the refractive index of the first oil. The results demonstrate that a minimum difference of 0.02 units of refractive index is required to visualize the mark.

TABLE 1

| Refractive index | Refractive index differential | Ease of visibility |
|---|---|---|
| 1.500 | 0.002 | Not visible |
| 1.510 | 0.012 | Not visible |
| 1.520 | 0.022 | Barely visible with microscope |
| 1.530 | 0.032 | Microscope |
| 1.540 | 0.042 | Microscope |
| 1.550 | 0.052 | Microscope |
| 1.560 | 0.062 | Microscope |
| 1.570 | 0.072 | Strip light |

Part 2. Refractive Index Measurements

The refractive index of the cured compositions was determined by the Becke Line Method, which entails matching the refractive index of finely cut strips of the cured composition with immersion liquids of known refraction properties. The test is performed under a microscope at 23° C. and with light having a wavelength of 589 nm. Series A-1 Refractive Index Liquids, supplied by Cargill Labs, were used as the immersion liquids and had a refractive index interval of 0.002 between specimens. The Becke Line Method is well-known in the art. A description of the method is found in Grellmann, Wolfgang; Seidler, Sabine. (2013). Polymer Testing (2nd Edition). Hanser Publishers, pp 308-309.

Part 3. Coating Compositions

Example RI-1—High Refractive Index Coating

CRYSTALCOAT™ C-410 (a thermally curable polysiloxane based coating, available from SDC Technologies, Inc.) was used as coating formulation RI-2. This coating has a reported refractive index of 1.62.

Example RI-2—High Refractive Index Coating

A UV curable coating was made by mixing the ingredients from Table 2. The resulting coating exhibited a refractive index of 1.594 when cured, as determined by the Becke Line Method described above.

TABLE 2

RI-2 coating composition

| Component | Weight % |
| --- | --- |
| MIRAMER ® M1142[1] | 68.2 |
| MIRAMER ® HR2200[2] | 22.2 |
| N-methylaminopropyltrimethoxysilane | 4.08 |
| IRGACURE ® 819[3] | 1.1 |
| GENOCURE ® MB[4] | 1.1 |
| IRGACURE ® 4265[5] | 1.1 |
| IRGACURE ® 1173[6] | 1.1 |
| Triarylsulfonium hexafluorophosphate salts[7] | 1.1 |
| BYK ® 348[8] | 0.02 |

[1]o-phenylphenol EO acrylate from Miwon Specialty Chemical Company, Ltd.
[2]A difunctional epoxy acrylate from Miwon Specialty Chemical Company, Ltd.
[3]A photoinitiator from BASF Dispersions & Pigments Division.
[4]A photoinitiator from Rahn AG.
[5]An acyl phosphine oxide photoinitiator from BASF Dispersions & Pigments Division.
[6]An alpha hydroxy ketone photoinitator from BASF Dispersions & Pigments Division.
[7]Available from Sigma Aldrich Co.
[8]A silicone surfactant available from BYK Additives & Instruments.

Example PC-1—Photochromic Polyurethane Coating

A photochromic polyurethane coating formulation was prepared according to Example PC-1 in publication WO 2015/054036A1. The resulting coating, when cured, exhibited a refractive index of 1.510 as determined by the Becke Line Method described above.

Example PL-1—Protective Coating Layer

A UV curable protective coating formulation was prepared according to Example PL-2 in publication WO 2015/054036A1. The resulting coating, when cured, exhibited a refractive index of 1.514 as determined by the Becke Line Method described above.

Part 4. Preparation of Coated Lenses

For all examples, prior to the application of any of the previously described coating formulations, lenses were subjected to an oxygen plasma using a Plasma Etch Model PE-50, available from Plasma Etch, Inc., under the conditions described in Table 3.

TABLE 3

Plasma conditions

| Pressure | 300 mtorr |
| --- | --- |
| Oxygen flow | 7 sccm |
| Plasma generator | 120 W 13.56 Mhz RF Power Supply at 100% |
| Treatment time | 3 minutes |

For the following examples, either 4.50 base 2.00 add Comfort II 1.50 index PAL ("4.50") or 1.50 base 2.00 add Comfort II 1.50 index PAL lenses ("1.50") were used as indicated, available from Essilor of America. Both substrates exhibited a measured refractive index of 1.498. These lens substrates comprise marks indicating progressive power on an optical lens, the marks being comprised of topographical lines 100 microns in width and 0.775 microns in height.

Example 1

A 4.50 base lens was coated with the high refractive index coating composition of Example RI-1 by spin coating to a target film thickness of 2.8 microns. The coated lens was then thermally cured for 8 minutes in a convection oven set at 125° C. After oxygen plasma treatment, the photochromic polyurethane coating of Example PC-1 was applied by spin coating to yield a target film thickness of 20 microns. The coated lens was thermally cured for 1 hour at 125°. After subsequent oxygen plasma treatment, the protective coating layer of Example PL-1 was applied by spin coating to a target film thickness of 12 microns. The coated lens was cured using a DYMAX® Model 5000 Flood system, available from Dymax Corporation, outfitted with a mercury bulb for 30 seconds, using the conditions described in Table 4. After UV cure, the lens was thermally treated for 1 hour at 125° C.

TABLE 4

UV cure conditions

| | Intensity (W/cm$^2$) | Dose (J/cm$^2$) |
| --- | --- | --- |
| UVA | 0.112 | 3.075 |
| UVB | 0.043 | 1.184 |
| UVC | 0.002 | 0.059 |
| UV V | 0.086 | 2.412 |

Example 2

A 1.50 base lens was coated with the high refractive index coating composition of Example RE-2 by spin coating to a target film thickness of 18 microns. The coated lens was then subject to UV cure for 30 seconds using the conditions outlined in Table 3. After subsequent oxygen plasma treatment, the photochromic polyurethane coating of Example PC-1 was applied by spin coating to yield a target film thickness of 20 microns. The coated lens was thermally cured for 1 hour at 125° C. After subsequent oxygen plasma treatment, the protective coating layer of Example PL-1 was applied by spin coating to a target film thickness of 12 microns. The coated lens was cured using a DYMAX® Model 5000 Flood system outfitted with a mercury bulb for 30 seconds, using the conditions described above in Table 3. After UV cure, the lens was thermally treated for 1 hour at 125° C.

Comparative Examples CE-3 and CE-4

A 4.50 base lens (CE-3) and a 1.50 base lens (CE-4) were each coated with the photochromic polyurethane coating of Example PC-1 by spin coating to yield a target film thickness of 20 microns. The coated lenses were thermally cured for 1 hour at 125° C. After subsequent oxygen plasma treatment, the protective coating layer of Example PL-1 was applied to each by spin coating to a target film thickness of 12 microns. The coated lenses were cured using a DYMAX® Model 5000 Flood system outfitted with a mercury bulb for 30 seconds, using the conditions described above in Table 3. After UV cure, the lenses were thermally treated for 1 hour at 125° C.

Table 5 summarizes the various coating stacks with respect to refractive indices (RI).

TABLE 5

|  | Substrate RI | High refractive index coating RI | Photo-chromic coating RI | Protective coating RI | RI difference: substrate to first coating |
|---|---|---|---|---|---|
| Example 1 | 1.498 | 1.620 | 1.510 | 1.514 | 0.122 |
| Example 2 | 1.498 | 1.594 | 1.510 | 1.514 | 0.096 |
| CE-3 | 1.498 | NA | 1.510 | 1.514 | 0.012 |
| CE-4 | 1.498 | NA | 1.510 | 1.514 | 0.012 |

Part 5 Results

The lenses of Examples 1-2 and CE 3-4 were evaluated for ease of visibility of the engraving by observing the lens with the naked eye with a light source illuminating through the lens. The visibility was determined on a scale of 1-5, with 5 being the most readily visible and 1 being not visible, as described in Table 6. A strip light is a standard fluorescent tube, while PAL-ID® (a product of Optivision) is a specialized configuration for identification of progressive marks on optical lenses. The results are summarized in Table 7.

TABLE 6

| Visibility rating scale | |
|---|---|
| 1 | Not visible |
| 2 | Difficult visibility in PAL-ID |
| 3 | Visible in PAL-ID. Not visible in strip light |
| 4 | Difficult visibility in strip light |
| 5 | Visible in strip light |

TABLE 7

| Results | |
|---|---|
|  | Visibility rating |
| Example 1 | 5 |
| Example 2 | 5 |
| CE-3 | 1 |
| CE-4 | 1 |

The present invention has been described with reference to specific details of particular aspects thereof. It is not intended that such details be regarded as limitations upon the scope of the invention except insofar as and to the extent that they are included in the accompanying claims.

What is claimed is:

1. An optical element comprising:
   (a) a first coating layer over at least a portion of a surface of an optical substrate having a mark on the surface of the optical substrate; and
   (b) one or more additional coating layers over at least a portion of the first coating layer,
   wherein,
   the first coating layer has a first refractive index and the optical substrate and the mark have a second refractive index, and
   a difference between the first refractive index and the second refractive index has an absolute value of 0.02 to 0.24,
   wherein the one or more additional coating layers have a third refractive index, and wherein a difference between the second refractive index of the optical substrate and the mark and the third refractive index has an absolute value of less than 0.02,
   wherein the first coating layer enhances a visibility of the mark when a source of electromagnetic energy is viewed through the optical element or when the electromagnetic energy is reflected from the optical element, and
   wherein an absence of the first coating layer reduces or eliminates a visibility of the mark when a source of electromagnetic energy is viewed through the optical element or when the electromagnetic energy is reflected from the optical element.

2. The optical element of claim 1, wherein the first coating layer covers at least a portion of the mark on the surface of the optical substrate.

3. The optical element of claim 1, wherein the mark is an optical reference mark, an indicia, or a topographical mark.

4. The optical element of claim 1, wherein at least a portion of the mark protrudes from the surface of the optical substrate or wherein at least a portion of the mark is depressed into the surface of the optical substrate.

5. The optical element of claim 1, wherein the first refractive index has a range of 1.37 to 2.14.

6. The optical element of claim 1, wherein the second refractive index has a range of 1.45 to 1.90.

7. The optical element of claim 1, wherein at least one of the first coating layer and the one or more additional coating layers is prepared from a mixture of two or more coating compositions.

8. The optical element of claim 1, wherein the first coating layer is selected from single or multi-layer thermoplastic clear films, single or multi-layer crosslinked clear films, and combinations thereof.

9. The optical element of claim 1, wherein the first coating layer includes at least one of a static dye and a photochromic compound.

10. The optical element of claim 1, wherein at least one of the first coating layer and the one or more additional coating layers is on at least one of a concave surface, convex surface, and a planar surface of the optical element.

11. A method of producing an optical element according to claim 1, the method comprising:
    (a) applying a first coating layer over at least a portion of a surface of an optical substrate having a mark on the surface of the optical substrate; and
    (b) applying one or more additional coating layers over at least a portion of the first coating layer.

12. The method of claim 11, further comprising pre-treating at least a portion of the surface of the optical substrate prior to applying the first coating layer.

13. The method of claim 12, wherein the pre-treating comprises a corona treatment, plasma treatment, ultraviolet radiation treatment, and combinations thereof.

14. The method of claim 11, wherein at least one of the first coating layer and the one or more additional coating layers is applied by a controlled deposition of a coating material in droplet form.

15. The method of claim 14, wherein the controlled deposition of the coating material is performed using a piezo-electric inkjet printing apparatus or a thermal inkjet printing apparatus.

16. The method of claim 14, wherein at least one of the first coating layer and the one or more additional coating layers is applied at least one of linearly and uniformly.

17. The method of claim 11, further comprising curing the first coating layer prior to applying the one or more additional coating layers or after applying one or more additional coating layers over at least a portion of the first coating layer.

18. The method of claim 17, wherein the curing comprises heat treatment, radiation treatment, electron beam treatment, or combinations thereof.

19. An optical element obtainable by the method of claim 11.

\* \* \* \* \*

UNITED STATES PATENT AND TRADEMARK OFFICE
CERTIFICATE OF CORRECTION

PATENT NO. : 10,371,866 B2
APPLICATION NO. : 15/556326
DATED : August 6, 2019
INVENTOR(S) : Jennine M. Frease et al.

Page 1 of 1

It is certified that error appears in the above-identified patent and that said Letters Patent is hereby corrected as shown below:

On the Title Page

Item (74), Attorney, Agent, or Firm, Line 1, delete "Web" and insert -- Webb --

Signed and Sealed this
Nineteenth Day of October, 2021

Drew Hirshfeld
*Performing the Functions and Duties of the
Under Secretary of Commerce for Intellectual Property and
Director of the United States Patent and Trademark Office*